(12) United States Patent
Barkman et al.

(10) Patent No.: US 9,389,058 B2
(45) Date of Patent: Jul. 12, 2016

(54) TRANSDUCER-ACTUATOR SYSTEMS AND METHODS FOR PERFORMING ON-MACHINE MEASUREMENTS AND AUTOMATIC PART ALIGNMENT

(71) Applicants: William E. Barkman, Oak Ridge, TN (US); Thomas A. Dow, Raleigh, NC (US); Kenneth P. Garrard, Raleigh, NC (US); Zachary Marston, Raleigh, NC (US)

(72) Inventors: William E. Barkman, Oak Ridge, TN (US); Thomas A. Dow, Raleigh, NC (US); Kenneth P. Garrard, Raleigh, NC (US); Zachary Marston, Raleigh, NC (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 514 days.

(21) Appl. No.: 13/746,201

(22) Filed: Jan. 21, 2013

(65) Prior Publication Data

US 2014/0202018 A1 Jul. 24, 2014

(51) Int. Cl.
*G01B 5/24* (2006.01)
*G01B 5/00* (2006.01)

(52) U.S. Cl.
CPC ... *G01B 5/24* (2013.01); *G01B 5/00* (2013.01)

(58) Field of Classification Search
CPC .................................................... G01B 5/24
USPC ...................................................... 33/645
See application file for complete search history.

(56) References Cited

U.S. PATENT DOCUMENTS

| | | | |
|---|---|---|---|
| 3,487,749 A | 1/1970 | Bschorer | |
| 3,602,090 A | 8/1971 | Whetham | |
| 3,667,290 A | 6/1972 | Hohn | |
| 4,698,773 A | 10/1987 | Jeppsson | |
| 4,707,793 A | 11/1987 | Anderson | |
| 2004/0236529 A1 | 11/2004 | Esterling | |
| 2006/0243107 A1 | 11/2006 | Mann et al. | |
| 2012/0247192 A1* | 10/2012 | Diaz et al. | 73/78 |

FOREIGN PATENT DOCUMENTS

EP 0762248 A1 3/1997

OTHER PUBLICATIONS s. J. Furst, T.A. Dow, K. K Garrard, and A. Sohn, "Automated Part Centering With Impulse Actuation," American Society of Mechanical Engineers, Feb. 2010, vol. 132, Issue 1.*

(Continued)

*Primary Examiner* — Christopher Fulton
(74) *Attorney, Agent, or Firm* — Clements Bernard PLLC; Christopher L. Bernard; Lawrence A. Baratta, Jr.

(57) ABSTRACT

Systems and methods for performing on-machine measurements and automatic part alignment, including: a measurement component operable for determining the position of a part on a machine; and an actuation component operable for adjusting the position of the part by contacting the part with a predetermined force responsive to the determined position of the part. The measurement component consists of a transducer. The actuation component consists of a linear actuator. Optionally, the measurement component and the actuation component consist of a single linear actuator operable for contacting the part with a first lighter force for determining the position of the part and with a second harder force for adjusting the position of the part. The actuation component is utilized in a substantially horizontal configuration and the effects of gravitational drop of the part are accounted for in the force applied and the timing of the contact.

17 Claims, 33 Drawing Sheets

(56) References Cited

OTHER PUBLICATIONS

Mears, M. Laine, Dissertation Presented to the Academic Faculty, "Geometry Estimation and Adaptive Actuation for Centering Preprocessing an Precision Measurement," May 2006, Georgia Institute of Technology, pp. 24-28.*

Stephen Joseph Furst (under the direction of Dr. Thomas A. Dow); Thesis "Automatic Handling Technology for Precision Turning of Two-Sided Parts"; Raleigh, NC—2009.

T. Ozel et al.; "Predictive modeling of surface roughness and tool wear in hard turning using regression and neural networks", International Journal of Machine Tools and Manufacture, Elsevier, vol. 45, No. 4-5, pp. 467-469 (Apr. 1, 2005).

Kwon, H.D. et al.; "Development and Application of a System for Evaluating the Feed-Drive Errors on Computer Numerically Controlled Machine Tools"; Precision Engineering, vol. 19, No. 2/3, pp. 133-140, Oct./Nov. 1996.

Brochure: Performance Measurement and Calibration Systems, RENISHAW: apply innovation, pp. 1-48, Printed in England 0307 (v7) L-8003-2424; (C) 2002-2007 Reinshaw plc.

Brochure: BEI Kimco Magnetics—Linear Voice Coil Actuators—All; Part No. LA12-17-000A, http://www.beikimco.com/actuators_linear.php—May 2008—BEI Kimco Magnetics—All Rights Reserved.

H. Olsson, K. J. Astrom, C. Canudas De Wit, M. Gafvert, P. Lischinsky; "Friction Models and Friction Compensation"; S. Andersson Seminar at the Department of Automatic Control, Lund Institute of Technology, Lund, Sweden, 1993.

P. R. Dahl; "A Solid Friction Model"; The Aerospace Corporation—May 1968.

M. Laine Mears; Dissertation Presented to the Academic Faculty: "Geometry Estimation and Adaptive Actuation for Centering Preprocessing and Precision Measurement"; Georgia Institute of Technology—May 2006.

Suresh Goyal, Andy Ruina, Jim Papadopoulos; "Planar sliding with dry friction Part 1. Limit surface and moment function"; Mechanical Engineering and Computer Science—Aug. 15, 1990.

Suresh Goyal, Andy Ruina, Jim Papadopoulos; "Planar sliding with dry friction Part 2. Dynamics of motion"; Mechanical Engineering and Computer Science—Received Mar. 27, 1990; accepted Aug. 15, 1990. (c) Elsevier Sequoia/Printed in The Netherlands.

Warren C. Young, Richard G. Budynas; Roark's Formulas for Stress and Strain' McGraw-Hill—Seventh Edition—Copyright (c) 2002, 1989 by the McGraw-Hill Companies, Inc.

R. Pohlman, E. Lehfeldt; "Influence of Ultrasonic Vibration on Metallic Friction"; Ultrasonics, Oct. 1966.

C. Siebenhaar; "Precise Adjustment Method Using Stroke Impulse and Friction"; Precision Engineering—Feb. 18, 2003 194-203.

Wesley H. Huang, M. T. Mason; "Experiments in Impulsive Manipulation" Proceedings of the 1998 IEEE International Conference on Robotics and Automation—Leuven, Belgium, May 1998.

Wesley H. Huang, "A Tapping Micropositioning Cell"; Proceedings of the 2000 IEEE Conference on Robotics and Automation, San Francisco, CA, Apr. 2000.

S. J. Furst, T.A. Dow, K. Garrard, and A. Sohn; "Automated Part Centering With Impulse Actuation"; J. Manuf. Sci. Eng—Feb. 2010—vol. 132, Issue 1, 011007 (9 pages)—(c)2010 American Society of Mechanical Engineers.

Yi-Chen Huang and Mou-Sheng Lin; "Tracking Control of a Piezo-Actuated Stage Based on Frictional Model"; Proc. of SPIE vol. 5757, 2005.

H. Suyama, T. Izumi, and Y. Hitake; "Two Dimensional Precise Positioning Using an Impulse Force Controlled by Fuzzy Reasoning"; IEEE, Sep. 1996.

Y. Yamagata and T. Higuchi; "A Micropositioning Device for Precision Automatic Assembly Using Impact Force of Piezoelectric Elements"; IEEE International Conference on Robotics and Automation—Nagoya, Japan May 1995.

Eun-Chan Park, Hyunk Lim, and Chong-Ho Choi; "Characteristics and Compensation of Friction at Velocity Reversal" Proceedings of the American Control Conference, vol. 1, 582-587, Jun. 2001.

C. C. Tsai and C. H Tseng; "The Effect of Friction Reduction in the Presence of In-Plane Vibrations"; Arch. Appl. Mech. (2006) 75. 164-167.

Zachary C. Marston; "An Accessory Device for the Automatic Alignment of Precision Turned Parts on a Vacuum Chuck'" MS Thesis, NC State University, Raleigh, NC—2012.

W. H. Huang and M. T. Mason; "Mechanics, Planning, and Control for Tapping"—The International Journal of Robotics Research, vol. 19, No. 10, pp. 883-894. Oct. 2000.

Kuo-Tsai Chang; "Friction Reduction Using Electrically Energized Piezoelectric Buzzer." The Japan Society of Applied Physics. vol. 44, No. 9A, pp. 6636-6643. 2005.

J. M Mears; "Geometry Estimation and Adaptive Actuation for Centering Preprocessing and Precision Measurement" Doctoral Dissertation, Georgia Institute of Technology, Atlanta, GA—2006.

G. Taubin; Estimation of Planar Curves, Surfaces and Nonplaner Space Curves defied by Implicit Equation: IEEE Trans, PAMI, 13, 1115-1138 (1991).

B. Bakys and N. Puodziuniene; "Alignment of Parts in Automatic Assembly Using Vibrations"—Assembly Automation 27/1 (2007) 38-43.

* cited by examiner

TRANSDUCER-ACTUATOR SYSTEMS AND METHODS FOR PERFORMING ON-MACHINE MEASUREMENTS AND AUTOMATIC PART ALIGNMENT

STATEMENT REGARDING FEDERALLY SPONSORED RESEARCH OR DEVELOPMENT

The U.S. Government has rights to the present disclosure pursuant to Contract No. AC05-00OR22800 between the U.S. Department of Energy and Babcock and Wilcox Technical Services Y-12, LLC.

FIELD OF THE DISCLOSURE

The present disclosure relates generally to machine tool setup, maintenance, and operation systems and methods. More specifically, the present disclosure relates to transducer-actuator systems and methods for performing on-machine measurements and automatic part alignment.

BACKGROUND OF THE DISCLOSURE

When performing machine tool setup and maintenance operations, it is frequently necessary to use a position transducer or the like to "sweep" a surface and establish its relationship to a machine datum. A machine operator or maintenance technician typically attaches a position indicator to one portion of a machine, and then "sweeps" the position transducer over the object of interest, while observing the "indicator run-out." If necessary, multiple adjustments and rechecks are made to the position of the object of interest to obtain the desired alignment condition.

Similarly, when machining a workpiece, it is frequently necessary to place the part in a particular position in relation to a fixture or a reference location, such as the center or plane of rotation of a spindle. A conventional approach for accomplishing this task is for a machine operator to manually measure the misalignment of the part and then move it into the correct position using a series of incremental steps. When a workpiece is being aligned on a spindle, the machine operator rotates the spindle while measuring the part "run-out" with a position transducer and "taps" the part with a mallet or the like to correct any misalignment. If non-figure-of-revolution surfaces are being aligned, then the machine's linear axes are used to "sweep" the surface into alignment.

While the above operations may usually be done accurately in an open machining environment, they may be very difficult and time consuming when access to the workpiece is constrained by the machine size or when the machine is enclosed in a glovebox or the like. In such a situation, the machine operator has limited visibility and manual alignment operations are difficult to perform, especially when done at arm's length, while wearing glovebox gloves. This is problematic.

Thus, centering a part on a spindle for precision machining, for example, is a tedious, time-consuming task under even the most ideal circumstances. Currently, a skilled operator must measure the "run-out" of a part using a displacement gauge or the like, then tap the part into place using a plastic or rubber hammer or the like. What are still needed in the art are systems and methods for automatically centering a part on a vacuum chuck, for example, with initial "run-out" that exceeds acceptable limits. In order to provide such systems and methods, one must measure the magnitude and direction of the radial "run-out" and then actuate the part until the part and spindle centerlines are within acceptable tolerances of each other. The "run-out" may be measured with either a position transducer mounted to a machine axis or an electronic gauge for example. The part is tapped into place with a linear actuator driven by a voice coil motor, for example. As a result, a part may be automatically corrected without significant human intervention.

As alluded to above, one of the most prevalent challenges in manufacturing precision parts is the alignment of a part on a holding fixture, such as a vacuum chuck. In a typical diamond turning operation, for example, an operator is required to manually place the part on the vacuum chuck then center the part. Also, during the fabrication of a two-sided part, for example, precision alignment is needed to align features on one side with features on the other side. For example, a hemi-shell must be machined such that the inner contour (IC) and outer contour (OC) are concentric. This requires that the part be transferred from one chuck designed for IC machining to another chuck designed for OC machining. This transfer process is usually done by a skilled operator who is responsible for removing the part from one chuck, then replacing and centering the part on the other chuck. In an ideal situation, an operator can center a part to within about 5 μm of the spindle centerline in about 15 minutes; however, in a limited access, limited visibility situation, the alignment operation may take much longer. The centering process involves measuring part "run-out" with a displacement gauge or the like, such as a Federal gauge or linear variable differential transformer (LVDT), then tapping the part with a plastic or rubber hammer or the like and repeating until the "run-out" is acceptably small. Automating the centering operation would advantageously reduce the overall human effort required and produce more accurate and repeatable positioning. The result would be a significant cost savings and improved part accuracy.

The behavior of the friction force, which holds a part on a vacuum chuck, is pivotal to the development of an improved realignment technique. Countless researchers have characterized the behavior of the friction force for a variety of applications—modeling it, studying the interplay of static and viscosity, analyzing its non-linearity as a function of velocity, explaining the behavior of the friction interface prior to slipping, etc. It has been suggested that the friction interface behaves as if the two relevant surfaces are coated with asperities that act like springs, allowing the two relevant surfaces to displace slightly under a force that is lower than static friction. When observed, this behavior is especially important in describing friction on the micrometer scale.

Work that applies friction models specifically to actuation against friction force and automated part alignment has also been attempted previously, including involving a tapping method of actuation. Some of this work has been based on a vertical actuator used to adjust the position of a workpiece on a horizontal rotary stage, where the normal force is generated entirely by the weight of the part—with and without the use of an impulse generated by an electromagnet, for example, which is incapable of producing a force output that is constant with stroke. The result has been poor control of the applied impulse, and an unnecessarily complicated mounting system when the technique is used with different sized parts. The work of the present disclosure is based on a horizontal actuator that may be mounted in a machine's tool holder.

Other work has attempted controlled impulse manipulation by tapping a part and using position feedback to ensure that the part approaches a commanded position. Additionally, the controllability of a micropositioning system has been explored using three separate tapping actuators on the same part. Further, tapping controlled by fuzzy reasoning and feedback from an eddy current probe has been employed to position a part. Others have attempted to align parts using high frequency, low amplitude vibrations generated by piezoelectric actuators or the like.

While such research has endeavored to position a part held in place by friction, many of the methods utilized require precise positioning of the realignment actuator, which operates over a short range. The long range actuators utilized by others do not provide a repeatable impulse through the required actuator stroke. This shortcoming makes it necessary to control the position of the actuator with respect to the part, or to use real-time feedback to determine the needed actuation power. Such needed control adds complexity, especially if the part moves substantially during a centering process, for example.

Thus, what is also still needed in the art is a long range actuator that may be used for the precision alignment required for the production of any part. The design of the system must be motivated by experimental studies of the friction interface and elastic collision between the actuator head and part. Analysis also must be given of several different methods for automating "run-out" measurements. Depending on the positioning accuracy required and available sensors, one method may be preferable to another.

BRIEF SUMMARY OF THE DISCLOSURE

In various exemplary embodiments, the present disclosure provides systems and methods for automatically aligning a workpiece on a machine tool spindle or the like, utilizing a machine-mounted probe to measure the position of the workpiece and an actuator to tap the workpiece into a desired location based on the position measurement. This transducer-actuator system combines these two functions into a single, self-contained assembly or device that may be mounted on a machine tool turret, a tool-changer magazine, a bracket with a magnetic base, or another machine element. The part tapper uses a linear actuator to tap the workpiece into the desired location; however, it is an open-loop device with no position-measurement transducer associated with the location of the actuator shaft. The transducer-actuator system adds a position transducer to the actuator assembly and incorporates a computer-based user interface, so that the device can be used as a position measurement system, by lightly contacting the part surface and recording the contact location, or as an actuator by contacting with enough force to move the part to a desired location.

The system may be used to perform automatic alignment of a part on a spindle or the like by first attaching the transducer-actuator to a machine's boring bar, turret, or other appropriate element. Then the actuator is moved within range of the part surface of interest, while the spindle is being rotated by the machine tool control system at a pre-selected speed. The transducer-actuator controller uses the pre-selected speed and/or the angular position of the spindle (as indicated by a device such as a spindle encoder) to determine when to activate a measurement cycle that lightly contacts the workpiece as it is rotating and determine the misalignment between the part and spindle. The controller then calculates the amplitude and location of alignment taps that are required to correctly align the part and commands the actuator to execute these taps as the spindle continues to rotate. The transducer-actuator controller may execute multiple measurement/movement cycles depending on the amplitude of the initial part misalignment and the desired degree of alignment accuracy. If the desired alignment accuracy is not achieved in a preset number of cycles (perhaps due to pre-existing part distortion) then the controller halts the alignment process and outputs a status signal.

The overall alignment cycle may be initiated from a computer-based user interface or from the machine tool control system via a command to the transducer-actuator controller that originates from either the part program or the machine operator. When the transducer-actuator controller completes the alignment process, it outputs a signal that indicates that it is appropriate to continue the manufacturing process. This measurement/alignment process may also be applied to a surface that is not a figure of revolution. In this instance, the machine axes are used to sweep the tapper-actuator past the surface of interest during the measurement and relocation operations.

The system may also be used to replace the position transducer used to sweep an arbitrary surface as part of set up operations. In this case, the transducer-actuator is attached (perhaps via a bracket with a magnetic base) to a moving element, such as a spindle or machine slide, and used to perform a task, such as aligning a spindle to a boring bar or measuring axes error motions via commands selected from a menu on the computer-based user interface.

In one exemplary embodiment, the present disclosure provides a system for performing on-machine measurements and automatic part alignment, including: a measurement component operable for determining the position of a part on a machine; and an actuation component operable for adjusting the position of the part on the machine by contacting the part with a predetermined force responsive to the determined position of the part. The measurement component consists of a transducer. The actuation component consists of a linear actuator. Optionally, the measurement component and the actuation component consist of a single linear actuator operable for contacting the part with a first lighter force for determining the position of the part and with a second harder force for adjusting the position of the part. Optionally, the part is coupled to the machine on a spindle via vacuum force. The system also includes an angular measurement component operable for measuring the angular position of the part. Preferably, when the actuation component is utilized in a substantially horizontal configuration, the effects of substantially vertical gravitational drop of the part when the part is contacted are accounted for in the force applied to the part by the actuation component and the timing of the contact using a processor.

In another exemplary embodiment, the present disclosure provides a method for performing on-machine measurements and automatic part alignment, including: providing a measurement component operable for determining the position of a part on a machine; and providing an actuation component operable for adjusting the position of the part on the machine by contacting the part with a predetermined force responsive to the determined position of the part. The measurement component consists of a transducer. The actuation component consists of a linear actuator. Optionally, the measurement component and the actuation component consist of a single linear actuator operable for contacting the part with a first lighter force for determining the position of the part and with a second harder force for adjusting the position of the part. Optionally, the part is coupled to the machine on a spindle via vacuum force. The method also includes providing an angular measurement component operable for measuring the angular position of the part. Preferably, when the actuation component is utilized in a substantially horizontal configuration, the effects of substantially vertical gravitational drop of the part when the part is contacted are accounted for in the force applied to the part by the actuation component and the timing of the contact using a processor.

In a further exemplary embodiment, the present disclosure provides a method for performing on-machine measurements and automatic part alignment, including: providing a measurement component operable for determining the position of a part on a machine; and providing an actuation component operable for adjusting the position of the part on the machine by contacting the part with a predetermined force responsive to the determined position of the part; wherein the actuation component is utilized in a substantially horizontal configuration and the effects of substantially vertical gravitational drop of the part when the part is contacted are accounted for in the force applied to the part by the actuation component and the timing of the contact using a processor. The measurement component consists of a transducer. The actuation component consists of a linear actuator. Optionally, the measurement component and the actuation component consist of a single linear actuator operable for contacting the part with a first lighter force for determining the position of the part and with a second harder force for adjusting the position of the part. The method also includes providing an angular measurement component operable for measuring the angular position of the part. The method further includes identifying a high spot associated with a rotating part and contacting the part at other than the high spot such that a combination of the contact force and gravitational force move the part to a desired alignment.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
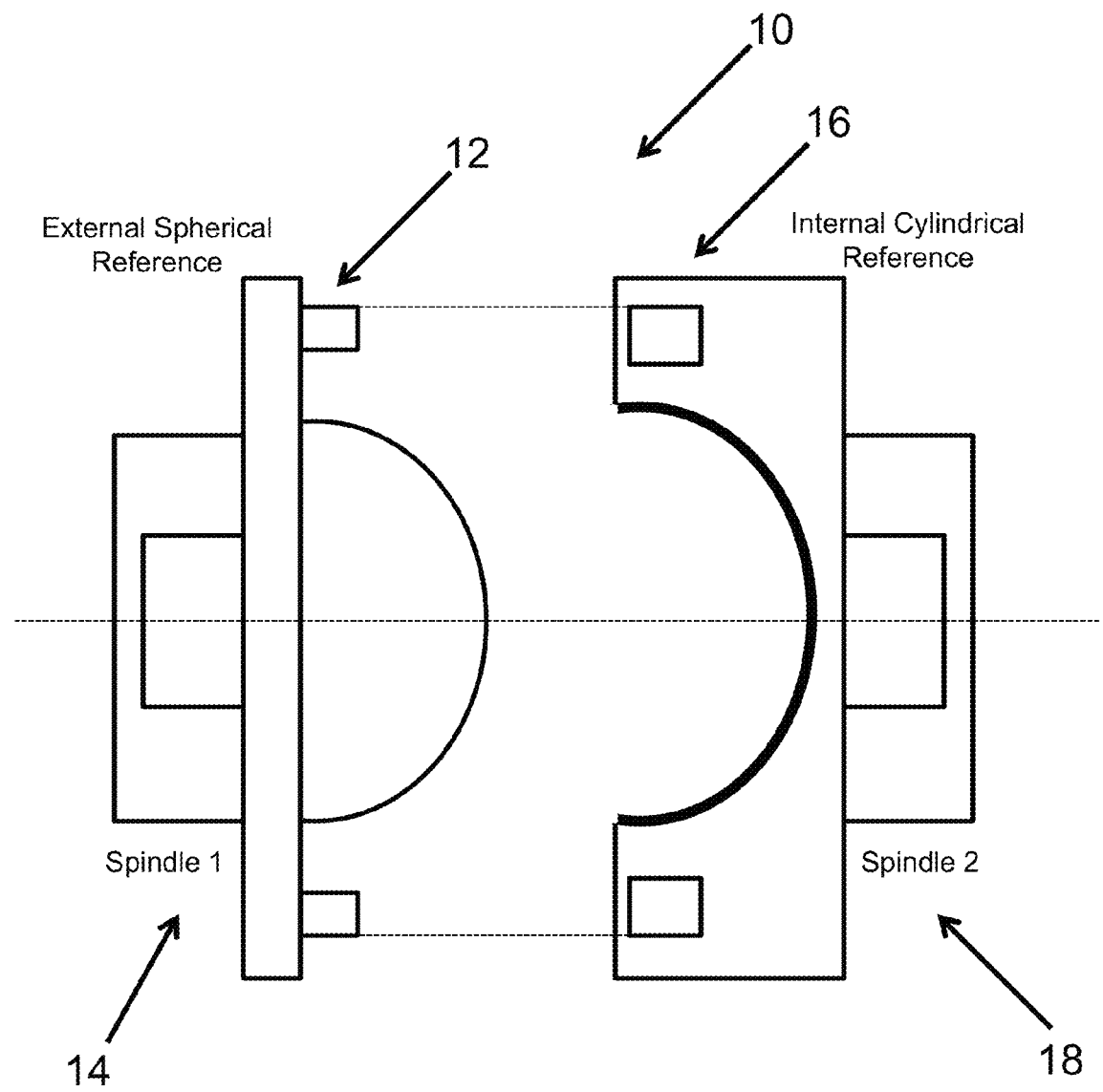
FIG. 1 is a schematic diagram illustrating one conventional part alignment technique.

In general, the precision centering of a part on a spindle (to within about 5 μm) can be accomplished in a number of different ways. For example, opposing chucks can be aligned in the context of an automated part transfer process, as illustrated in FIG. 1. This technique 10 requires the mechanical coupling of "self-aligning" features, such as a spherical surface or reference 12 associated with a first spindle 14 and a cylindrical surface or reference 16 associated with a second spindle 18. A part and receiving chuck could be machined with similar self-aligning features. However, this method would subject the part to potentially high forces and wear. It also necessitates the fabrication of precision reference surfaces on both the part and receiving chuck. These drawbacks make such a mechanical mating alignment method undesirable.

Alignment can also be accomplished through the use of sensors and actuators. An electronic displacement gauge or probe mounted to a scaled machining axis can measure the run-out of a misaligned part. Then, the part can be actuated towards the spindle centerline, for example, and the run-out can be measured again. This process can be repeated until the run-out is sufficiently small. This method requires knowledge of the accuracy of different run-out measurement techniques, as well as the behavior of the friction force which must be overcome to move a part held by a vacuum.

There are several conventional methods to find the magnitude and direction of run-out. The accuracy of these methods depends on the part's deviation from a perfect sphere. The first method involves using a probe to locate three points on the surface of a sphere. A single sphere radius and center-point can be calculated based on these three points. This method can accurately measure parts that have very small form errors; however, small deviations in any of the three measurement points are magnified when the center-point location is calculated.

Figure 2:
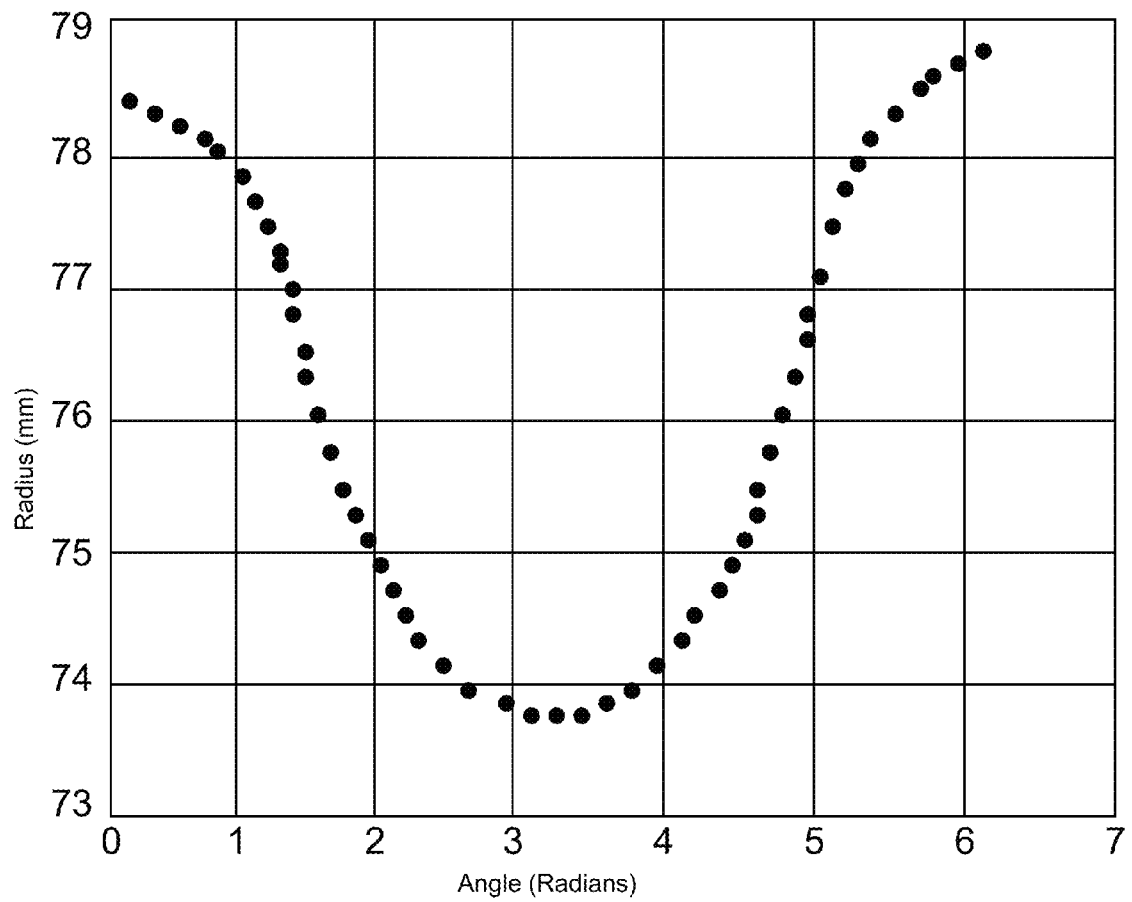
FIG. 2 is a plot illustrating measurement points and a best-fit sinusoid for a run-out measurement associated with another part alignment technique.

If the part differs significantly from a sphere, a second method, which employs more measurement points, can be used to reduce the uncertainty of the calculated center-point location. In the second method, a best-fit sine wave is correlated to a series of measurement points. A sample sinusoid fit to a finite number of measurement points evenly spaced on the equator of a sphere with radius of 76.2 mm is illustrated in FIG. 2. The amplitude of this sine wave represents the magnitude of the run-out and the phase indicates the direction.

In both conventional methods discussed above, the form errors of the part (2σ±5 μm, for example) and the probe's repeatability errors (2σ±0.3 μm, for example) cause each measurement point to be offset from the nominal part radius. When a finite number of measurement points are used, these errors result in uncertainty in the measurement of the best-fit sine wave's amplitude (i.e., the run-out). Measuring more points reduces this uncertainty. For normally distributed form and probe measurement errors, the uncertainty of the run-out measurement approaches zero as the number of points approaches infinity.

Figure 3:
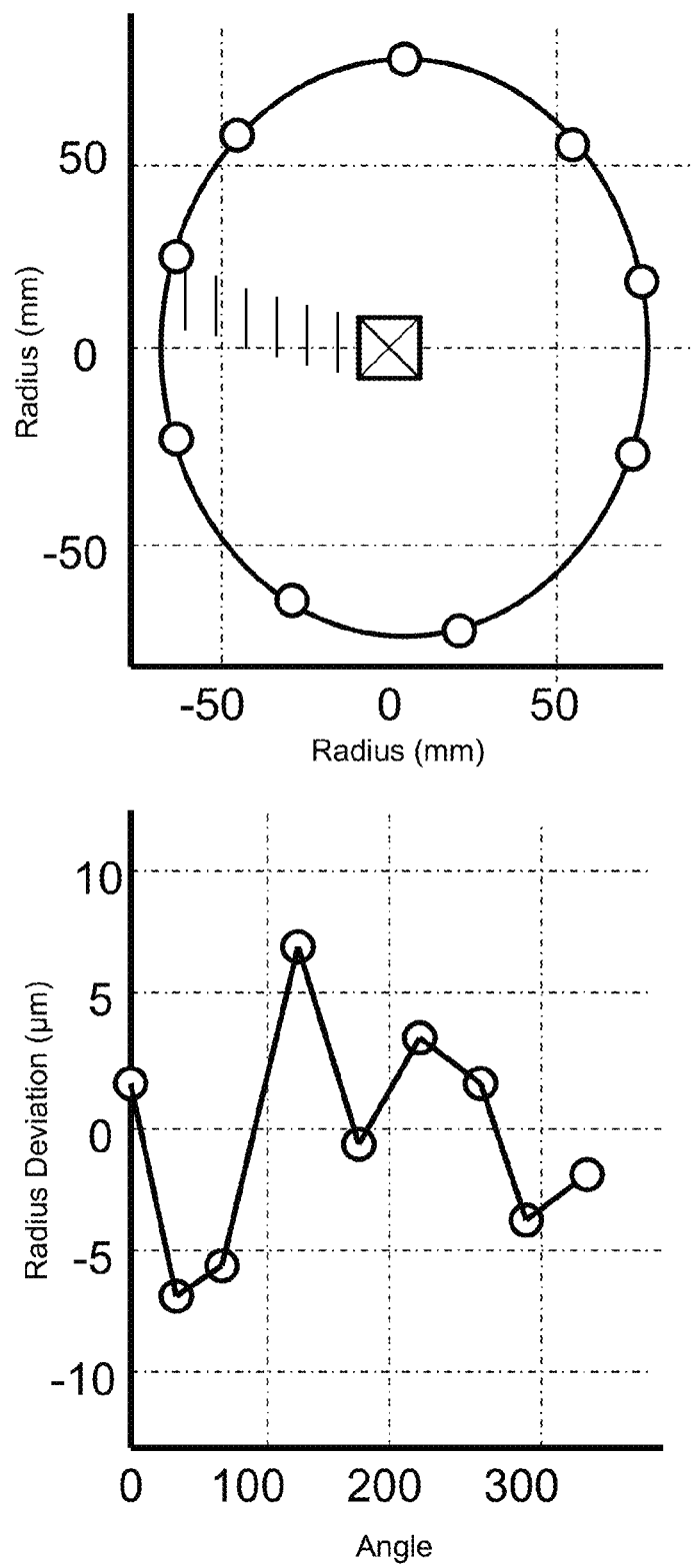
FIG. 3 is series of plots illustrating chosen measurement points and randomly generated radial deviations associated with another part alignment technique.

The number of points needed to achieve a certain measurement uncertainty is determined by simulating measurement points and errors using appropriate software, for example. A circle of radius 76.2 mm is plotted to represent a planar section of a perfect sphere. Measurement points are evenly distributed around the circle. At each measurement point, a radial error is randomly selected, and added to the radial coordinate of the original measurement point. This error point represents the location of a simulated probe trigger. Since these errors come mostly from the ±5 μm part form error, the random errors are normally distributed about the nominal circle, with 2σ equal to 5 μm. With this distribution, 96% of the randomly selected points are within ±5 μm of the nominal point location. FIG. 3 illustrates 9 measurement points evenly distributed around a circle, along with the magnitude of the randomly selected radial error associated with each point. The best fit circle of the errors is taken to find the measured radius and center-point location. The location of the high spot is indicated by the dotted vector. In this case, the high spot is only the result of sampling error, since the nominal circle is actually centered at the origin (i.e., the part has zero run-out).

Figure 4:
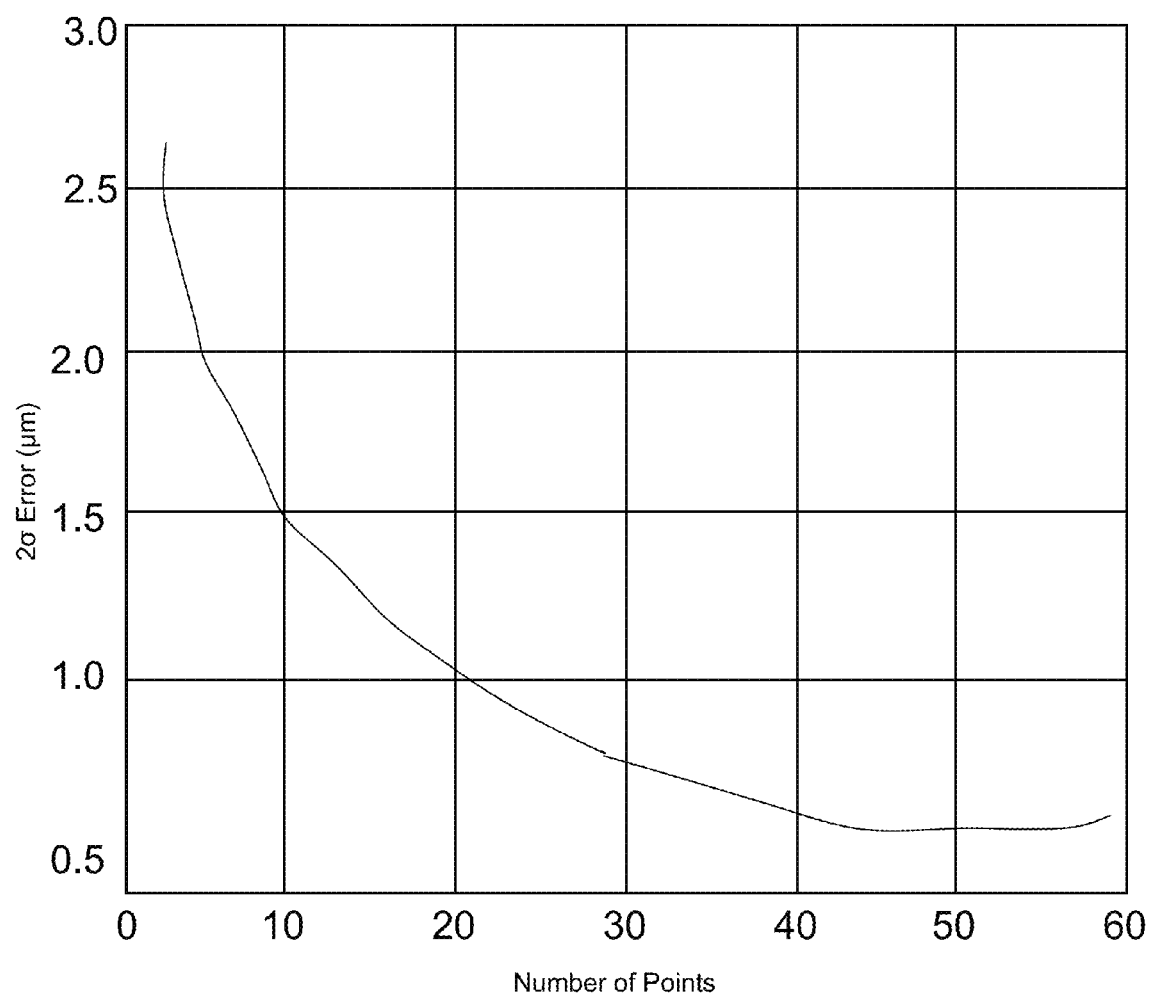
FIG. 4 is a plot illustrating the hemishell center-point location uncertainty associated with another part alignment technique.

In the case illustrated in FIG. 3, the center of the best-fit circle is offset from the exact center by 1.04 μm (41 μin) at an angle of 174 degrees. Each time this measurement is repeated, a different center offset magnitude and direction is generated, because the randomly chosen errors are different. By repeating this calculation 10,000 times, for example, an estimate of the standard deviation of the center offset error can be calculated. FIG. 4 illustrates that measuring more points decreases the standard deviation of the center offset error. This 2σ standard deviation represents the uncertainty of a run-out measurement, in general.

Figure 5:
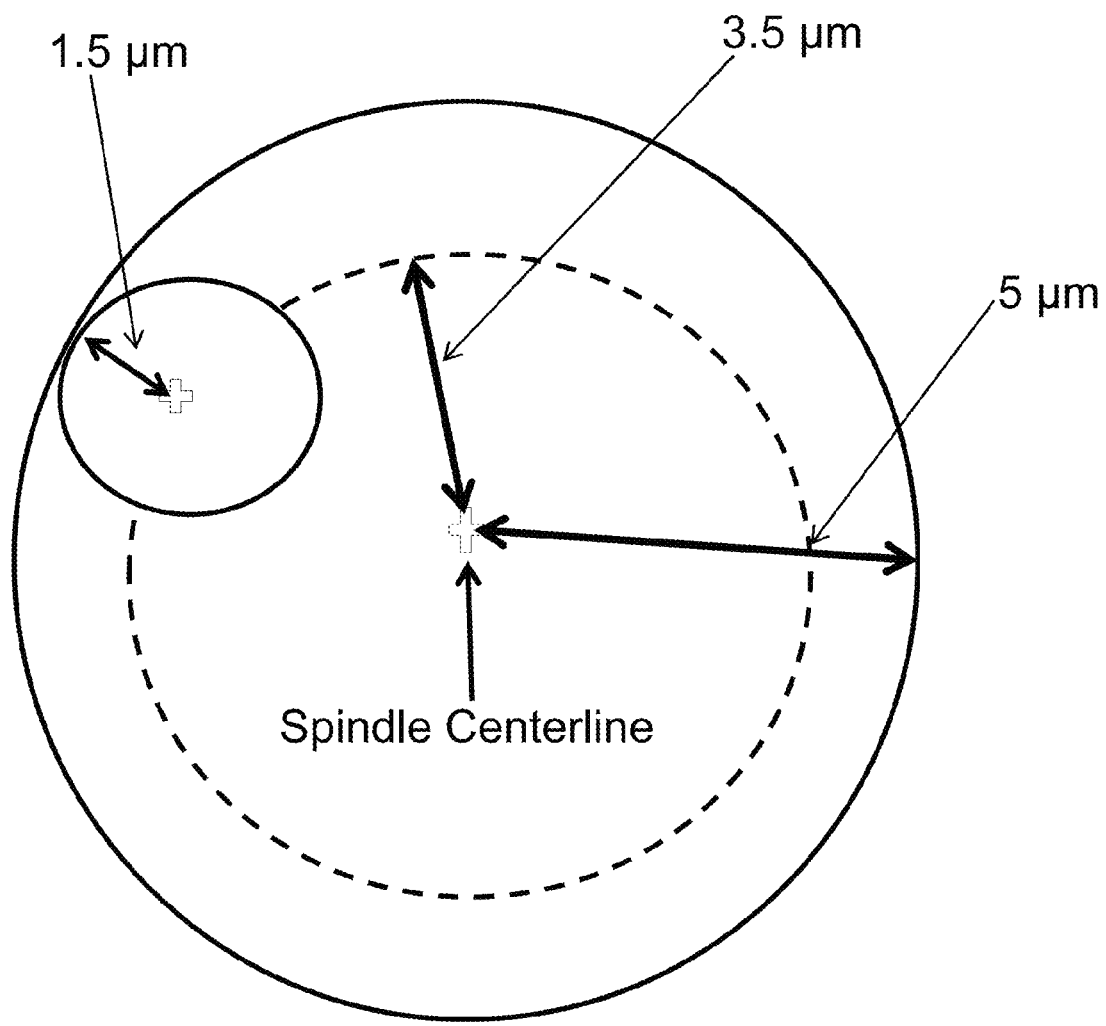
FIG. 5 is a plot illustrating the influence of center-point measurement uncertainty associated with another part alignment technique.

It is desirable for the realignment system to be capable of placing the nominal center of a part to within 5 μm (200 μin) of the spindle centerline, for example. However, FIG. 4 illustrates that using 9 measurement points results in a run-out measurement uncertainty of 1.5 μm. If 9 measurement points are used to measure the theoretical part, it is necessary to place the measured center-point to within at most 3.5 μm of the spindle centerline. FIG. 5 illustrates that the 5 μm error budget is made up of a 1.5 μm measurement uncertainty plus 3.5 μm (83 μin). The 3.5 μm value represents half the maximum value of the actuator's incremental displacement. Therefore, if 9 measurement points are used to measure this simulated part with 10 μm (40 μin) form error, the actuator must be able to move the part with accuracy greater than 7.5 μm to ensure that the actual circle center-point can be placed within 5 μm of the spindle centerline.

Once the magnitude and direction of the radial run-out are determined, the part must be realigned with some sort of actuator. Since friction is the dominant force that keeps a part from moving on a vacuum chuck, its behavior must be considered in actuator design.

Substantial work has been done to characterize the highly non-linear phenomenon of friction. The nature and origin of the friction force are not perfectly known, but theories exist and the behavior of friction is well characterized. In general, friction force retards motion between two parallel, contacting surfaces. Friction force is modeled as the product of a friction coefficient, μ, and a normal force, N, as provided in Equation (1).

$$F_f = \mu N \qquad (1)$$

In reality, friction force is much more complicated than this simple relation because the friction coefficient is not constant. Typically, the static friction coefficient between two contacting surfaces with no relative velocity is higher than the dynamic friction coefficient, which results when the two surfaces are sliding. The reduction of friction due to a relative velocity between the two contacting surfaces is known as Coulomb friction.

Figure 6:
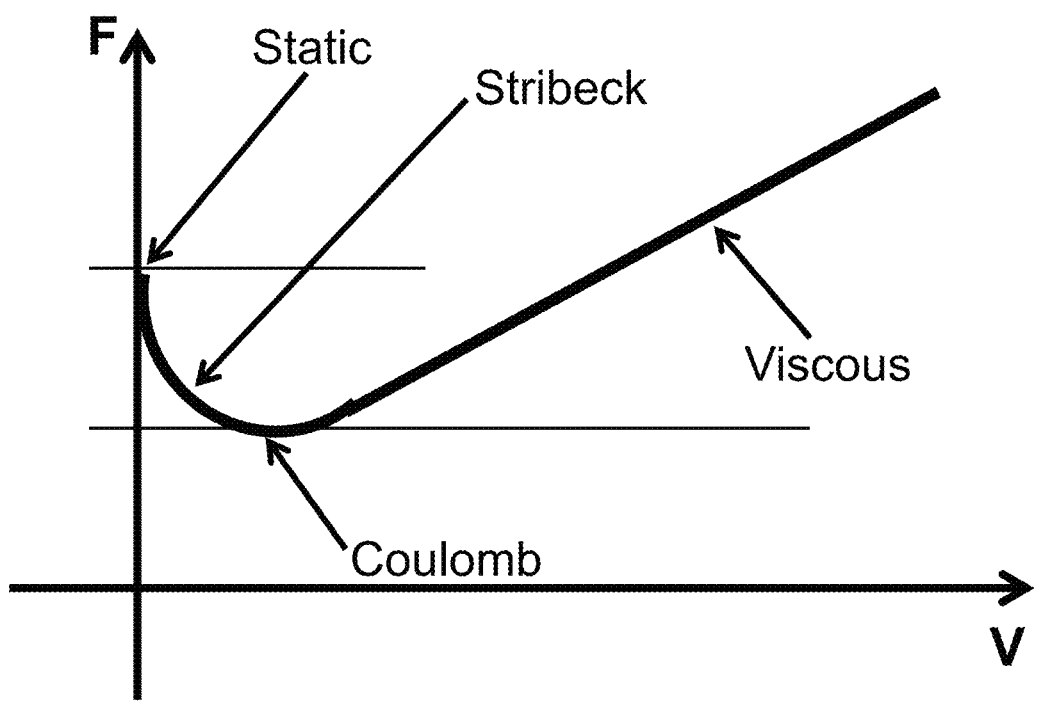
FIG. 6 is a plot illustrating a standard model of friction force as a function of velocity associated with another part alignment technique.

Stribeck friction attempts to describe the behavior of the friction force as a function of velocity, particularly in the transition between static and dynamic friction. FIG. 6 illustrates the different types of friction forcing phenomenon.

Stribeck friction is approximated as a smooth curve that connects the static friction force to the dynamic (Coulomb) friction level.

For the purpose of part alignment on a small scale, the relative velocity between the two sliding surfaces—the part and the vacuum chuck face—is small (~10 mm/s). As a result, the effects of viscous friction can be ignored. However, for micrometer positioning, it is also important to consider how the friction interface behaves in response to an applied force that is less than the static friction limit.

Figure 7:
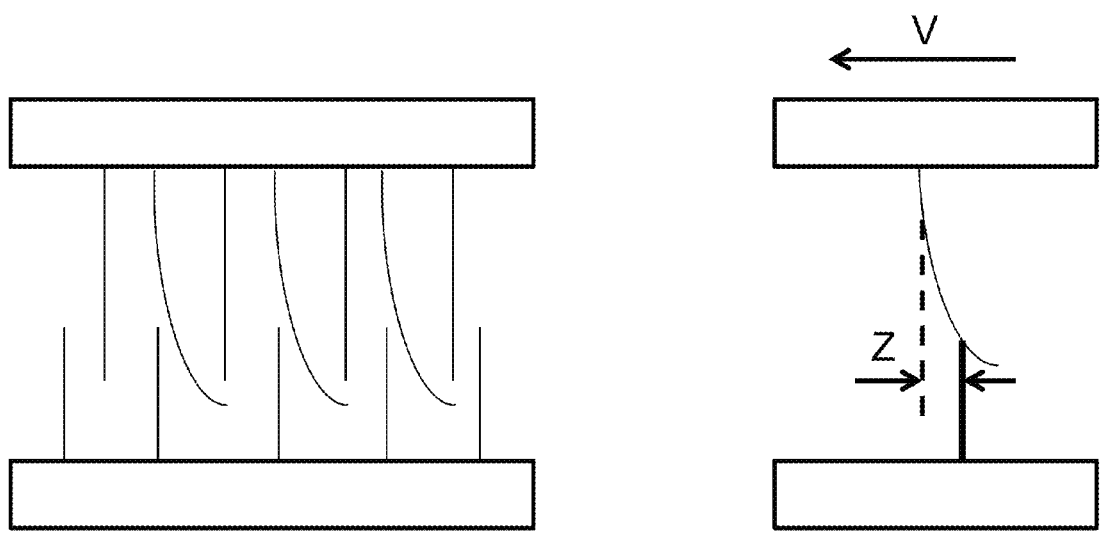
FIG. 7 is a schematic diagram illustrating elastic asperities at the friction interface associated with another part alignment technique.

In general, when no translating force is applied to an object, the friction force holding the object in place is zero. When a translating force lower than the static friction limit is applied, the friction force increases to exactly oppose the applied force. Once the applied force increases beyond the static friction limit, a part begins to slide on a surface and the friction force decreases as prescribed by Stribeck and Coulomb friction. Additionally, some researchers have attempted to explain the behavior of the friction interface under an applied translational force that is lower than the static friction limit. The friction interface has been modeled as a series of elastic bristles, or asperities, that allow the two surfaces to displace a few micrometers with respect to one another. FIG. 7 illustrates how these asperities can deflect, allowing one surface to move. The asperities may deflect slightly under forces lower than the static friction limit.

The asperities model has been applied to a rolling ball guide, where the friction interface is a junction between two curved surfaces under Hertzian deflection. It has been posited that the strain in the asperities, which temporarily reduce force at the friction interface, is a displacement-dependent phenomenon. This claim is supported by others who show how the friction force changes dramatically during velocity reversal, when the strain on the asperities switches from one direction to another. Researchers have recorded the tracking error of a machine tool, and showed that the magnitude of the tracking error increases dramatically when the direction of the velocity is reversed. This increase in error results in a temporary, but large, decrease in friction force.

Much has been learned about the friction interface from research, as well as modeling and testing. This information is used in developing a method for positioning a part that is held on a vacuum chuck by friction. The effects of Stribeck and Coulomb friction have both been simulated and measured. It is clear that the friction coefficient drops when a part starts slipping. This effect results in stick-slip behavior, which creates an impediment for precision control. Since the relationship between the dynamic friction coefficient and the relative velocity is dependent on the conditions and materials at the interface, a positioning method is designed to be as robust as possible to changes in the friction coefficient. The interface behaves differently if it is contaminated with oil or chips, for example.

Regardless of the actuation method employed, a force that is greater than the static friction limit needs to be applied to move a part. However, once the part starts to slip and the friction force decreases, the part accelerates under the same applied actuation force. Therefore, the best positioning control comes from force that exceeds the static friction limit for a short period of time before being removed. This forcing behavior is best realized with a tap, which is equivalent to a static push that is removed quickly.

Figure 8:
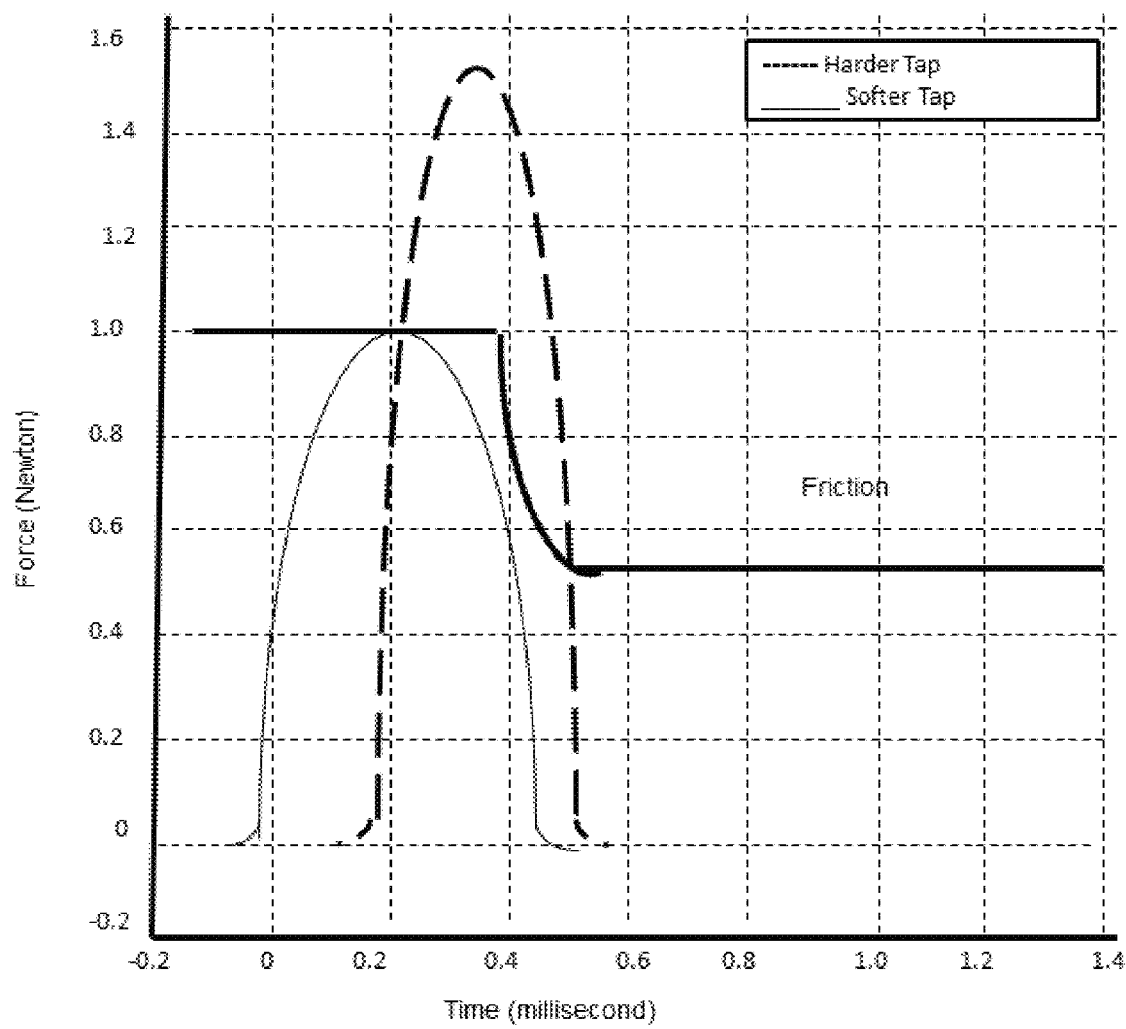
FIG. 8 is a plot illustrating idealized force profiles of two separate taps superimposed with an approximation of friction force associated with another part alignment technique.

FIG. 8 illustrates the idealized force profiles of two separate taps superimposed with an approximation of the friction force. Once the tap force exceeds the static friction limit, the part starts to slip, the friction force drops, and the difference between the input tap force and the retarding friction force accelerates the part. The area between the tap force profile and the friction force profile is proportional to the momentum imparted on the part. Even when the peak of the tap force barely exceeds the static friction limit, as in the case of the solid line in FIG. 8, there is a non-zero amount of work done on the part. This suggests that there is a minimum distance a part can be moved against the non-linear friction force.

Among other things, the present disclosure provides an actuator that applies a controlled impulse to a part through tapping. A number of specific requirements are satisfied in the design of the tapping actuator. These requirements ensure that the actuator has the ability to position the part precisely and repeatedly, while limiting the direct exposure of the part to the potentially damaging machine axes. For example, in one exemplary embodiment, the actuator:

1. Generates a momentum of 0.04 Nm/s on an impacting mass.
2. Holds the velocity of the mass constant for 3 mm of stroke.
3. Limits friction and wear within the actuator.
4. Operates under DC power with simple waveforms.
5. Operates at a frequency of at least 2 Hz.
6. Functions in a vertical or horizontal orientation.
7. Has a total length less than 12.5 cm (5").

Figure 9:
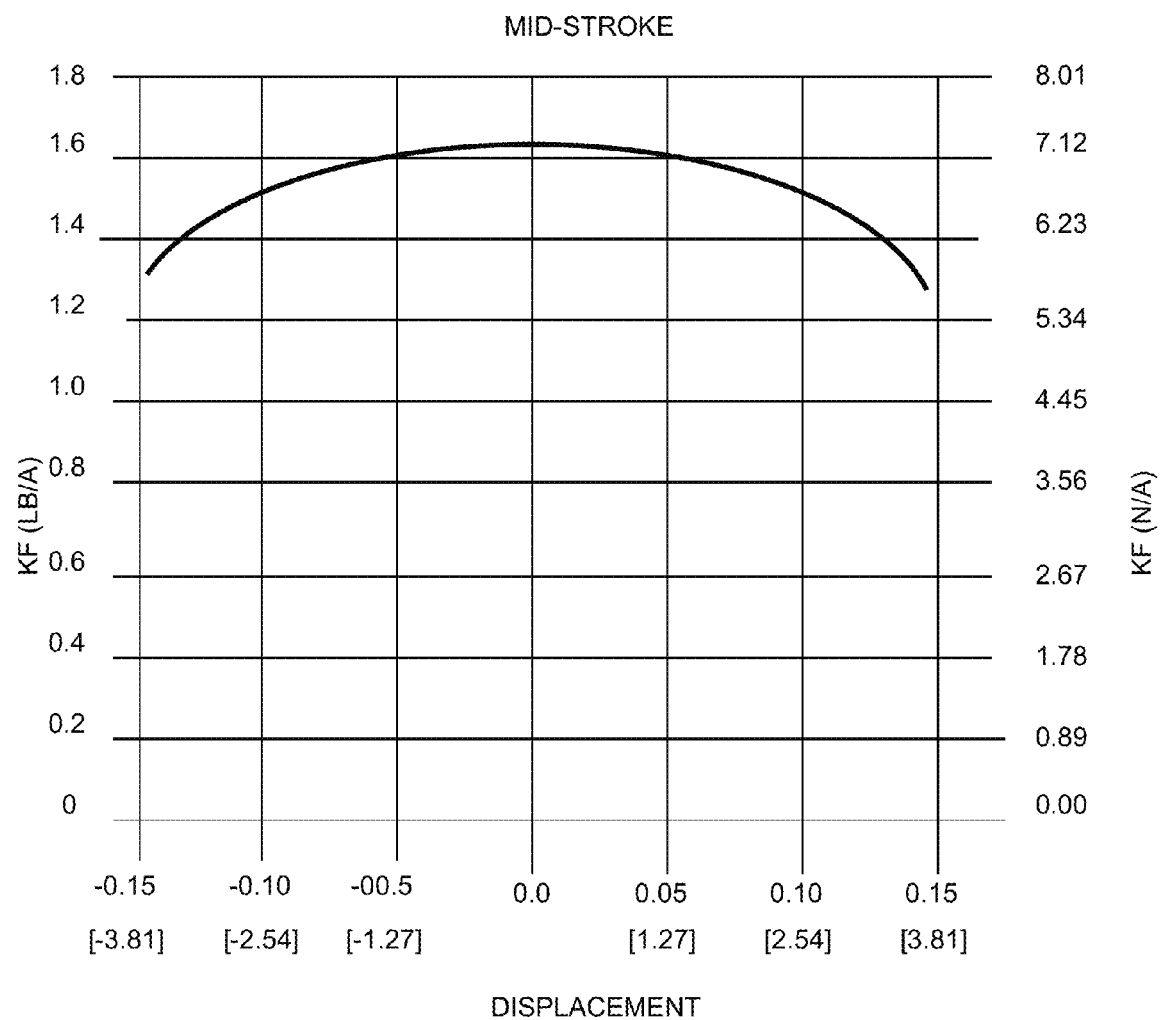
FIG. 9 is a plot illustrating the variation of force with stroke in a voice coil motor in accordance with the systems and methods of the present disclosure.

A voice coil motor (VCM) is one means to accelerate the moving mass of the tapping actuator and hold the velocity of the mass constant through 3 mm of stroke, for example. For a typical VCM, the actuation force varies somewhat, as illustrated in FIG. 9. However, this force variation is much less significant than that seen in a solenoid actuator, for example.

Figure 10:
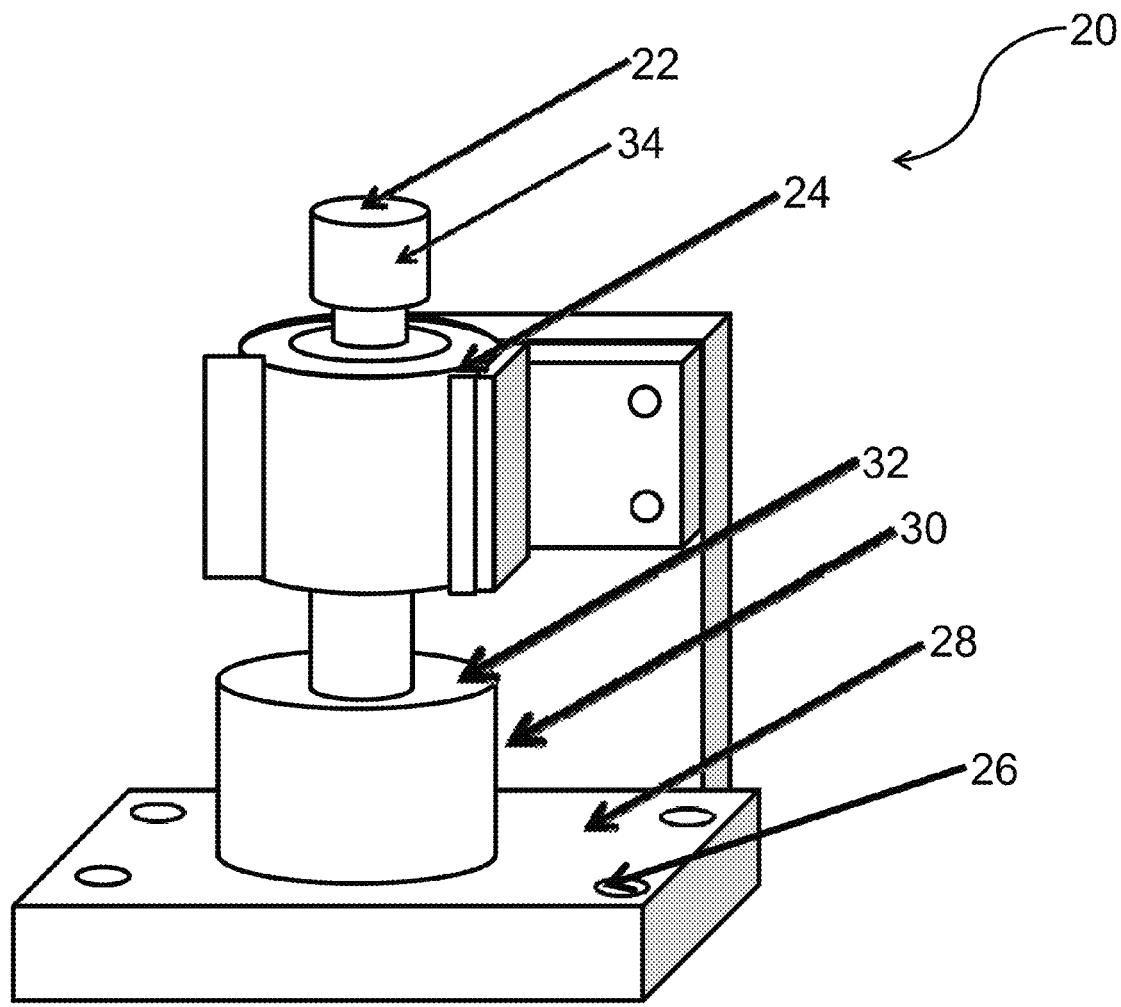
FIG. 10 is a perspective view of one exemplary embodiment of the tapping actuator of the present disclosure.
Figure 11:
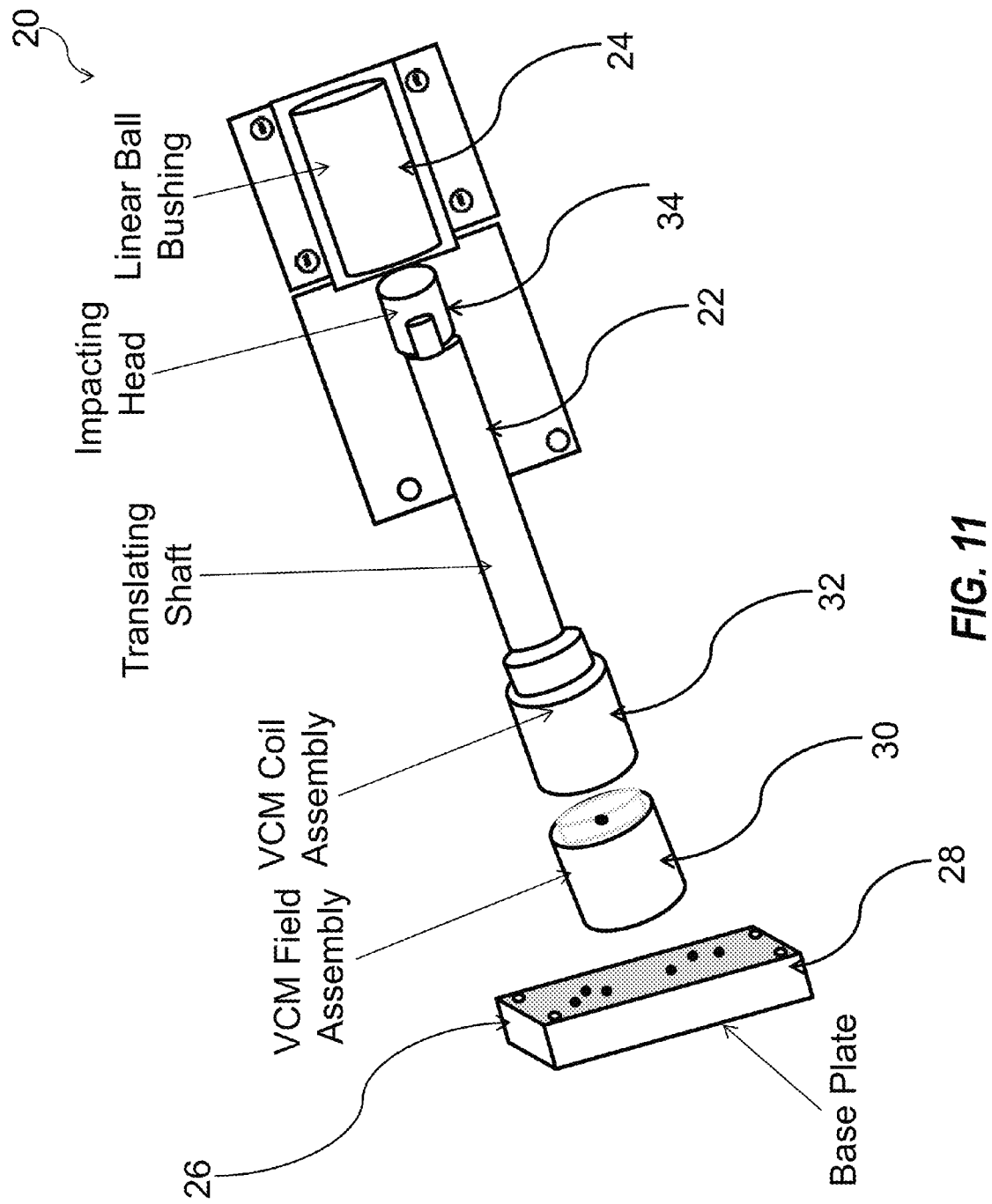
FIG. 11 is an exploded perspective view of one exemplary embodiment of the voice coil motor actuator of the present disclosure.

Referring specifically to FIGS. 10 and 11, in one exemplary embodiment, the VCM-based actuator 20 is designed to accelerate a translating shaft 22 (i.e., the impacting mass) to the desired impact velocity, then hold the core at that velocity until it impacts the part (not illustrated) and produces an actuation force profile. The core travels on a Thomson Precision Steel linear ball bushing 24, for example. The total length of the actuator 20 is 12.4 cm, in this exemplary embodiment. The through-holes 26 on the base plate 28 are drilled slightly larger than the bolts (not illustrated) that secure the VCM field assembly 30. This allows the field assembly 30 to be precisely aligned with the coil assembly 32, translating shaft 22, and linear ball bushing 24.

The Hertzian deflection of the impacting head 34 and the aluminum part surface (not illustrated) causes a tap to produce force in a profile similar to those illustrated in FIG. 8. The deflection of the impacting bodies allows the collision to take place over a finite, non-zero time, thus preventing damaging force spikes. The behavior of the two impacting spheres during a tap can be related by equations for elastic deformation.

As a Hertzian impact progresses, the centers of the two impacting spheres approach each other and the force and maximum stress between them builds according to Equations 2 and 3.

$$P = \left(\frac{y}{1.040}\right)^{\frac{3}{2}} * \left(\frac{K_D}{C_E^2}\right)^{\frac{1}{2}} \quad (2)$$

$$\text{Max\_}\sigma_c = 1.5 \frac{P}{\pi a^2} \quad (3)$$

$$= 0.918 * \sqrt[3]{\frac{P}{K_D^2 C_E^2}}$$

where $C_E$ and $K_D$ relate to the material properties and diameters of the two impacting bodies via:

$$C_E = \frac{1-v_1^2}{E_1} + \frac{1-v_2^2}{E_2} \text{ and } K_D = \frac{D_1 D_2}{D_1 + D_2} \quad (4)$$

Figure 12:
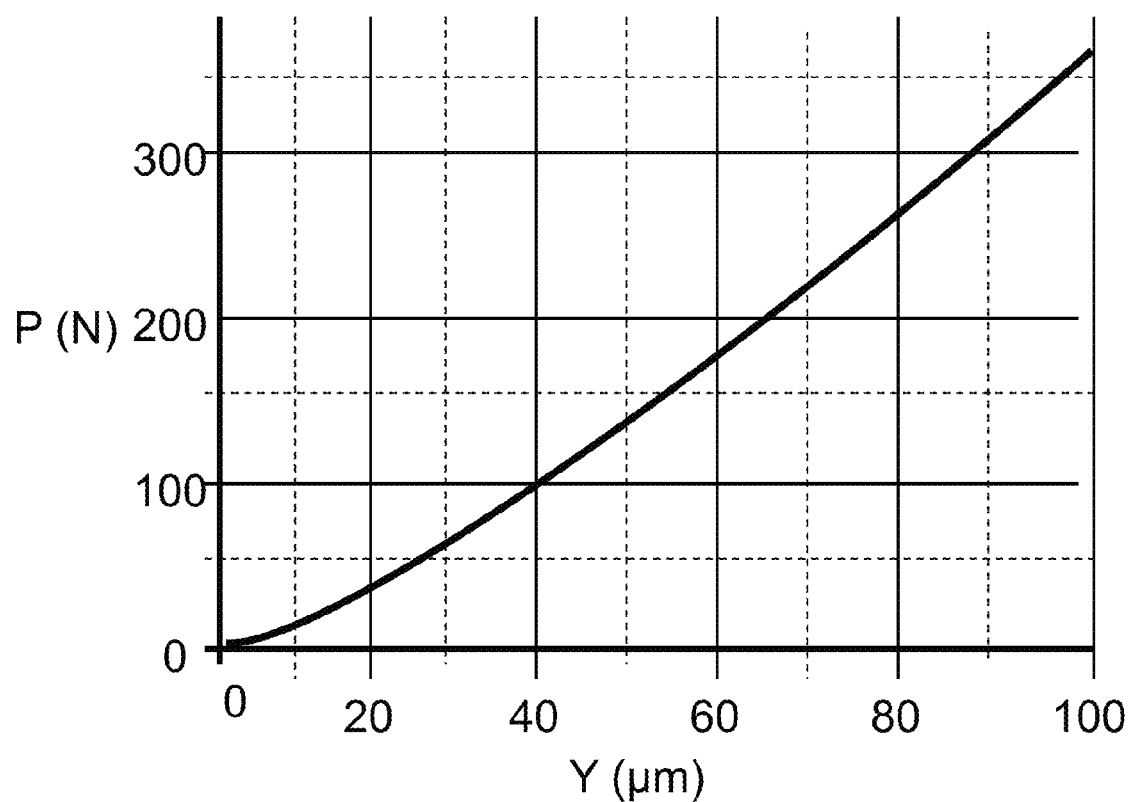
FIG. 12 is a plot illustrating the variation of impact stroke, y, with applied force in accordance with the systems and methods of the present disclosure.

FIG. 12 illustrated that a peak force of 250 N develops an impact stroke of about 75 μm. When the impact starts, the tapper head 34 has depth, y, of zero. As the impact progresses the force that the actuator 20 exerts on the part increases. The initial energy of the tapper's translating element 22 required to generate an impact stroke of 75 μm and peak force of 250 N can be found via:

$$E_0 = \int_{y=0}^{y=75} P(y)\,dy \quad (5)$$

Equation (5) represents the area under the curve in FIG. 12. Substituting Equation (2) for P(y), Equation (5) can be solved for the initial kinetic energy required to produce a peak impact force, P.

$$E_0 = \frac{2*1.040^{\frac{3}{2}}}{5} * \frac{C_E^{\frac{2}{3}}}{K_D^{\frac{1}{3}}} P^{\frac{5}{3}} \quad (6)$$

Figure 13:
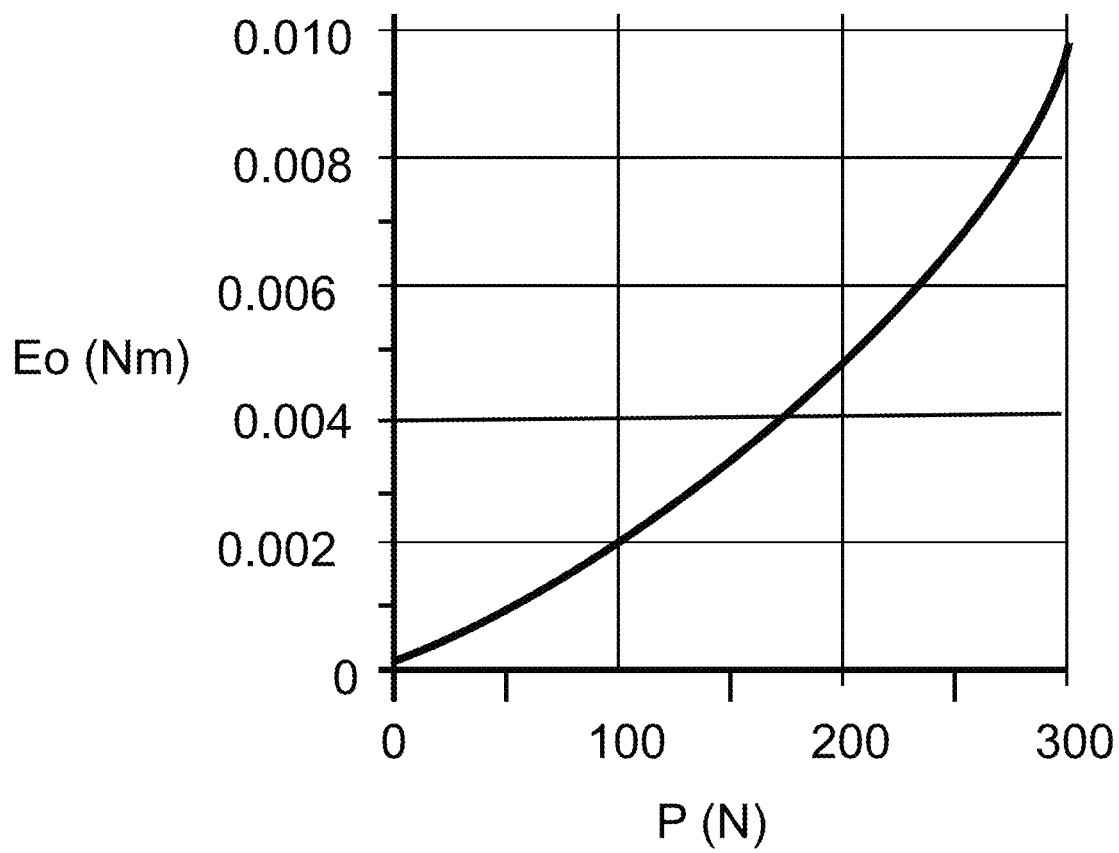
FIG. 13 is a plot illustrating the initial kinetic energy required to produce a peak impact force in accordance with the systems and methods of the present disclosure.

Equation (6) is plotted in FIG. 13.

Figure 14:
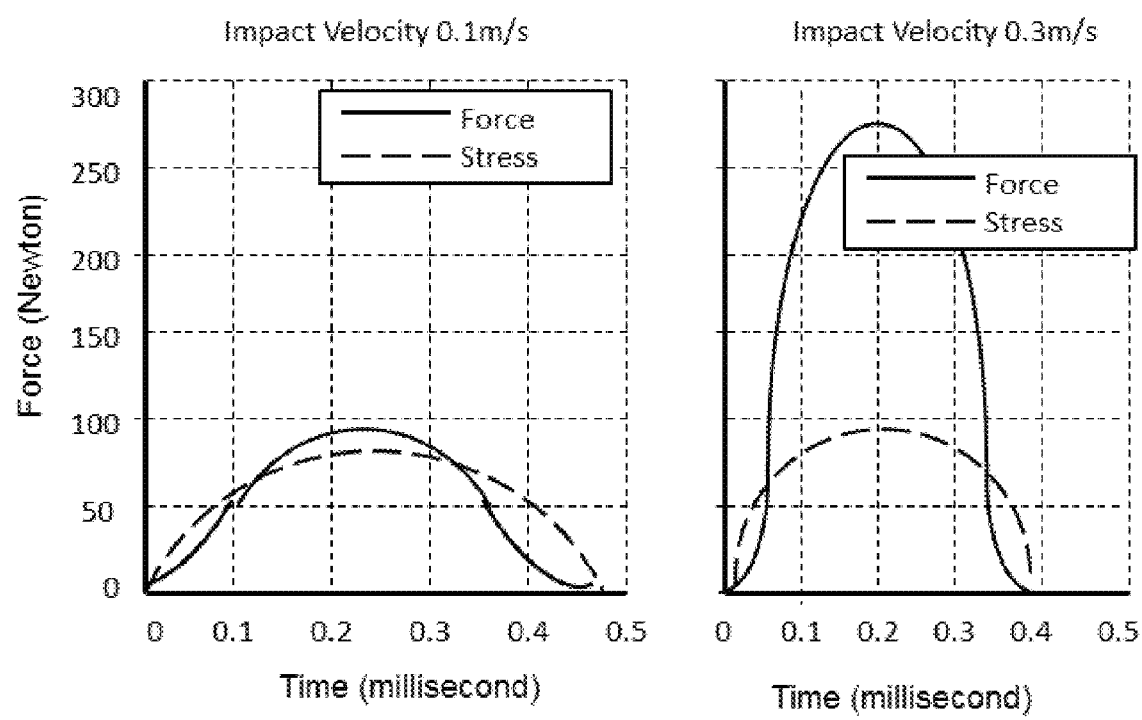
FIG. 14 is a series of plots illustrating force and stress during simulated collisions in accordance with the systems and methods of the present disclosure.

The force and stress profiles during a collision between a 95 g translating actuator shaft element 22, for example, and a stationary hemisphere (not illustrated) are simulated using a discrete time model. The actuator head 34 is made from polyethylene and has a diameter of 2.5 mm, for example, and the hemisphere has a diameter of 76.2 mm and is made of aluminum, for example. The applied force is calculated from Equation (2) and the maximum stress over the impacting area at each time is calculated from Equation (3), as illustrated in FIG. 14.

These simulations provide evidence as to how the impact force and stress behave during taps of different magnitudes. A tap that generates a peak force of 275 N, for example, produces a peak stress over the area of the impact of 95 MPa, for example. This value is below the yield stress for both materials involved in the collision. An understanding of the peak stress allows a designer to choose a tapper head 34 with a diameter and modulus that will not plastically deform the part during actuation. If the modulus of either material is increased, the force and stress profiles become narrower and have higher peak values.

Figure 15:
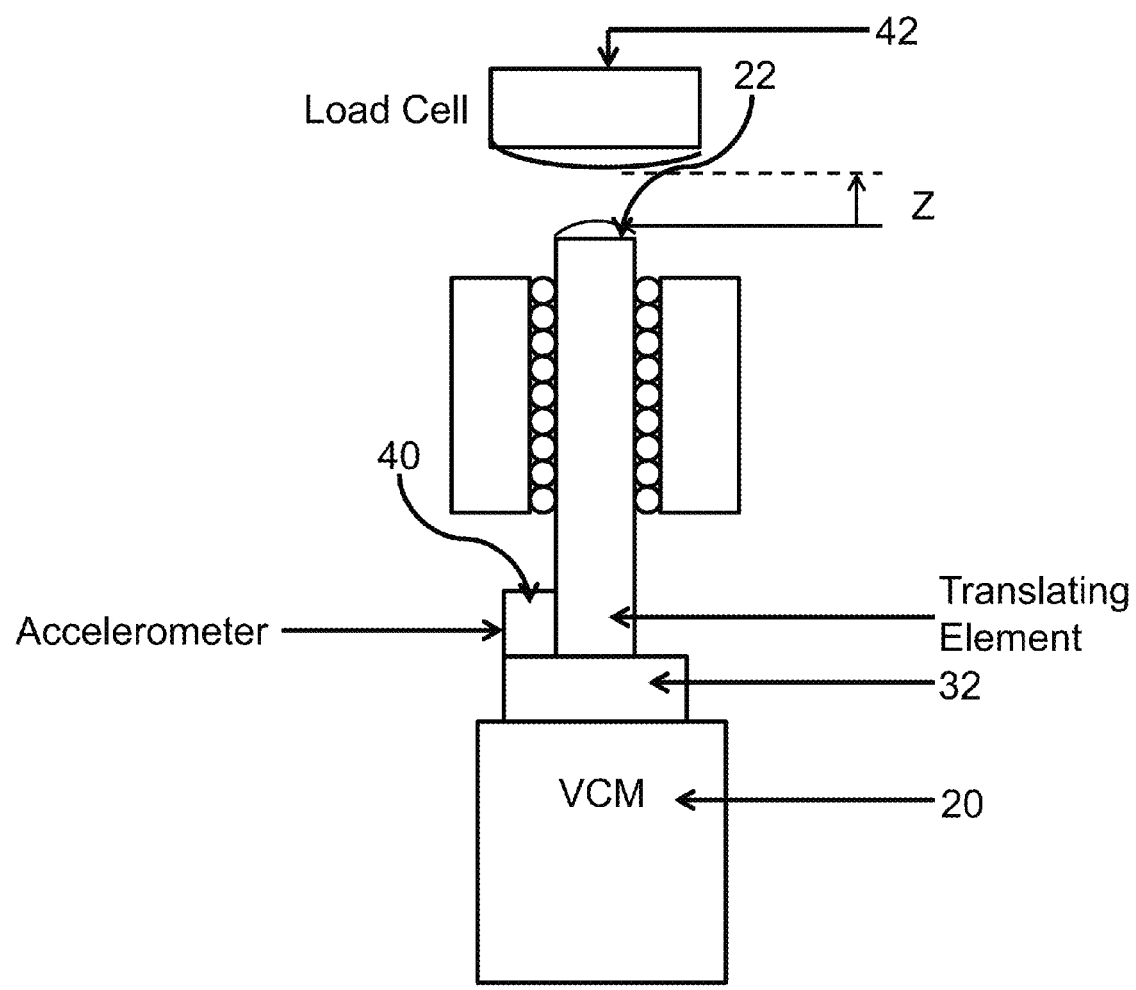
FIG. 15 is a schematic diagram illustrating a test setup for the voice coil motor actuator of the present disclosure.

Experimental Testing:

The realignment actuator 20 was assembled as designed and tested in the setup illustrated in FIG. 15 An accelerometer 40 is used to measure the velocity of the translating shaft 22 and coil assembly, and a load cell 42 is used to measure the peak impact force that results from a given impact velocity.

The impact is generated by the collision between the translating shaft element 22 of the VCM actuator 20 and a stationary load cell 42. The VCM actuator 20 is driven with the waveform illustrated in FIG. 16. The high voltage step is used to accelerate the sliding element, while the low voltage step is used to hold the element at a constant velocity against gravity (in a vertical configuration) and viscous friction within the ball bushing. This input is multiplied by a gain between 0.4 and 1.0 to control the applied impulse. If the frequency is increased, the duty cycle is also increased proportionately so as to maintain a constant input energy per tap.

Figure 17:
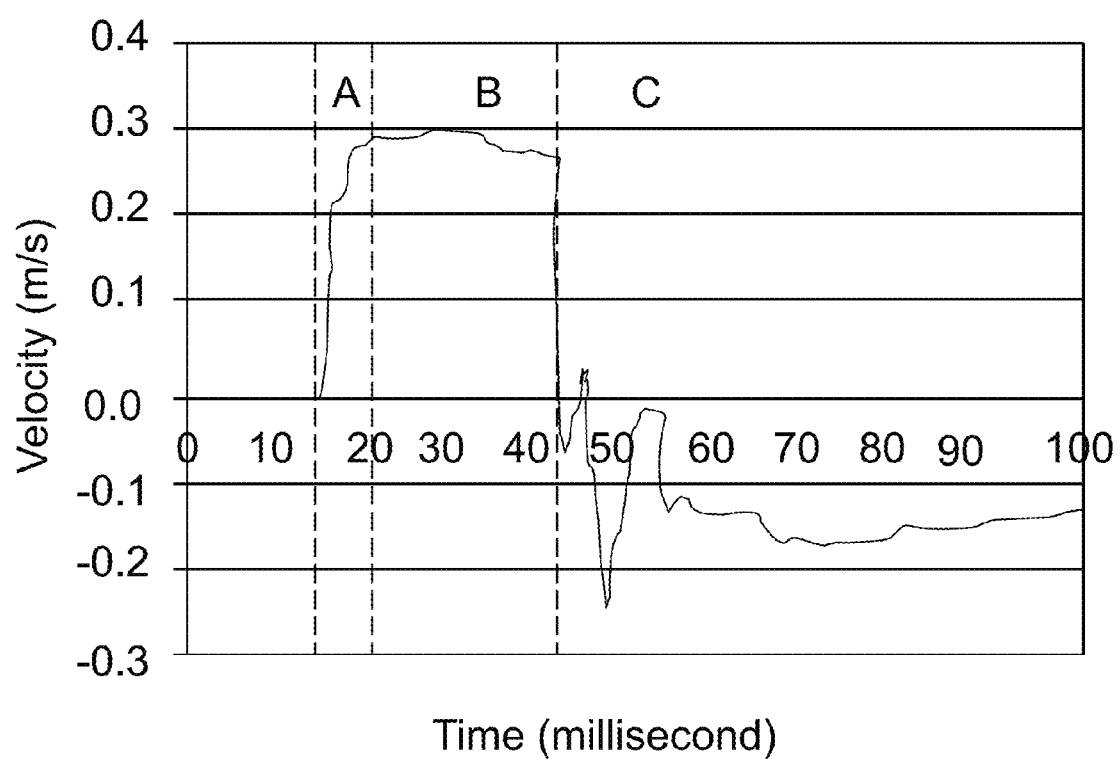
FIG. 17 is a plot illustrating a typical velocity profile of the translating core of the voice coil motor actuator of the present disclosure.

The velocity profile of the translating shaft 22 during a typical tap is illustrated in FIG. 17. Region A represents the acceleration phase of the shaft 22, region B represents the period when the input voltage is at a constant, low value that counters gravity and friction, and region C represents the behavior of the shaft 22 following impact. The VCM actuator 20 is able to maintain a fairly constant velocity through region B, during which the moving element 22 translates 6 mm. This behavior is expected because the actuation force of a VCM is fairly constant with stroke.

Figure 18:
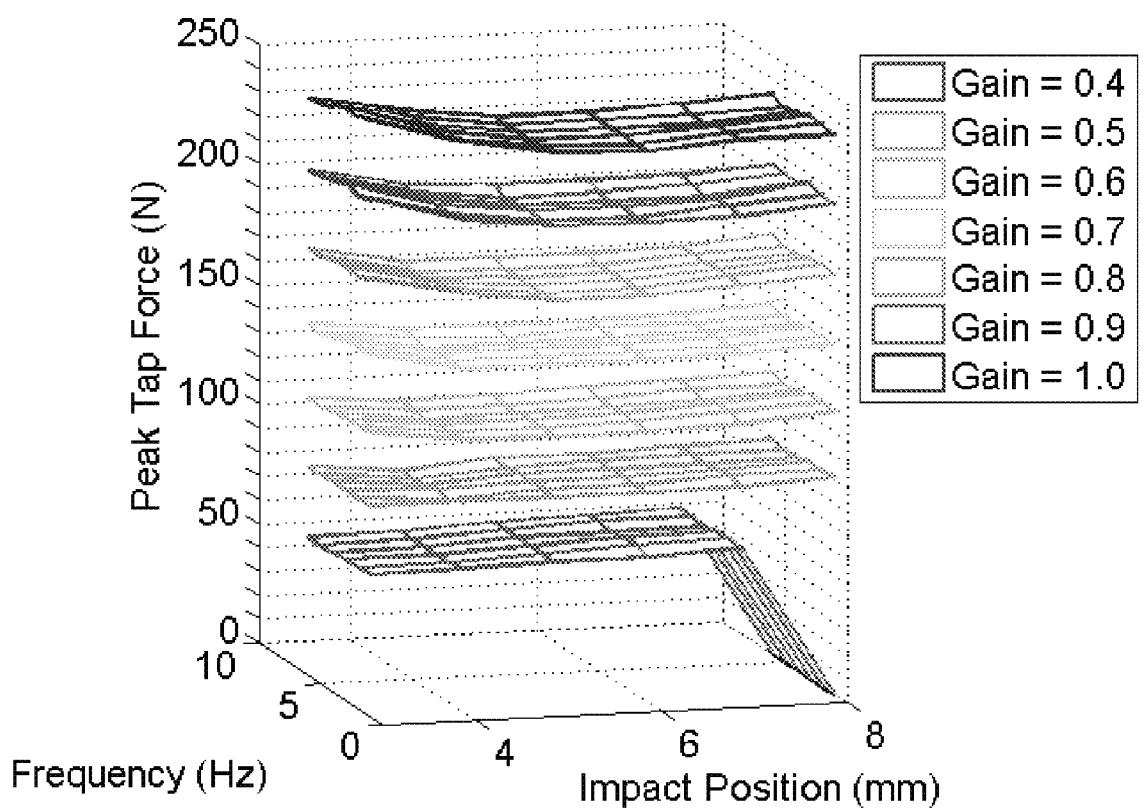
FIG. 18 is a plot illustrating the peak impact force variation in accordance with the systems and methods of the present disclosure.

The load cell 42 was tapped while located at 6 different z-positions using 6 different frequencies. Placing the load cell 42 at different z-positions helps to quantify how the impact energy of the translating shaft element 22 varies through the stroke of the actuator 20. At each position, frequency, and impulse magnitude, the load cell 42 was tapped 10 times, and the average peak force plotted as illustrated in FIG. 18.

Figure 19:
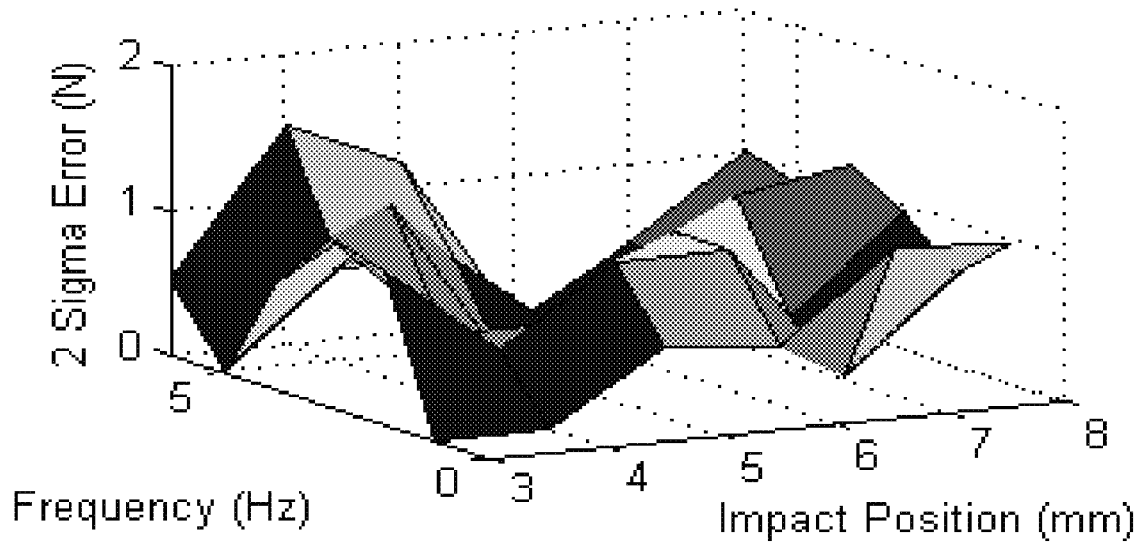
FIG. 19 is a plot illustrating the deviation of repeated taps at a given impulse magnitude in accordance with the systems and methods of the present disclosure.

The repeatability of the 10 taps at each position/frequency point is quantified by the standard deviation. The largest $2\sigma$ deviation of peak impact force of all of the data points taken was less than 2 N. The standard deviation of the peak force for repeated taps at an impulse magnitude of 0.6 is illustrated in FIG. 19. This repeatability is typical of the series of taps at all impulse magnitudes between 0.4 and 1.0, for example.

Figure 16:
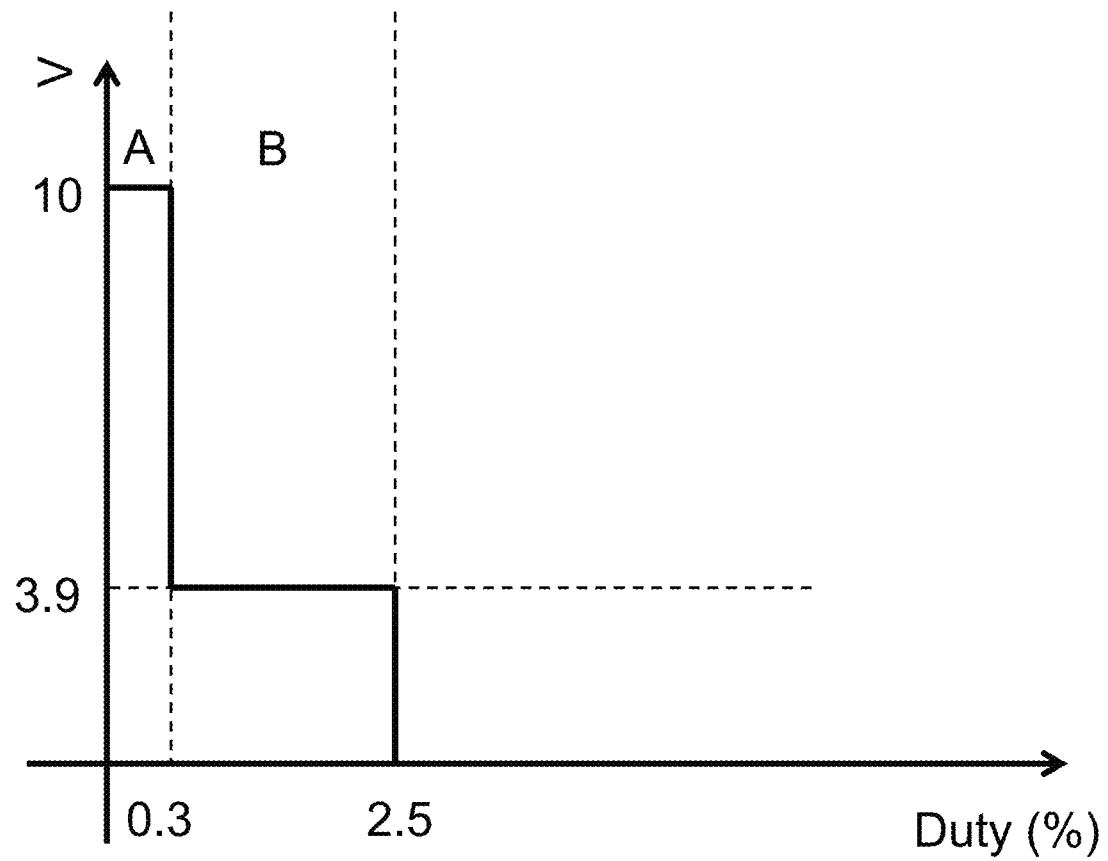
FIG. 16 is a plot illustrating an exemplary testing voltage input for the voice coil motor actuator of the present disclosure.
Figure 20:
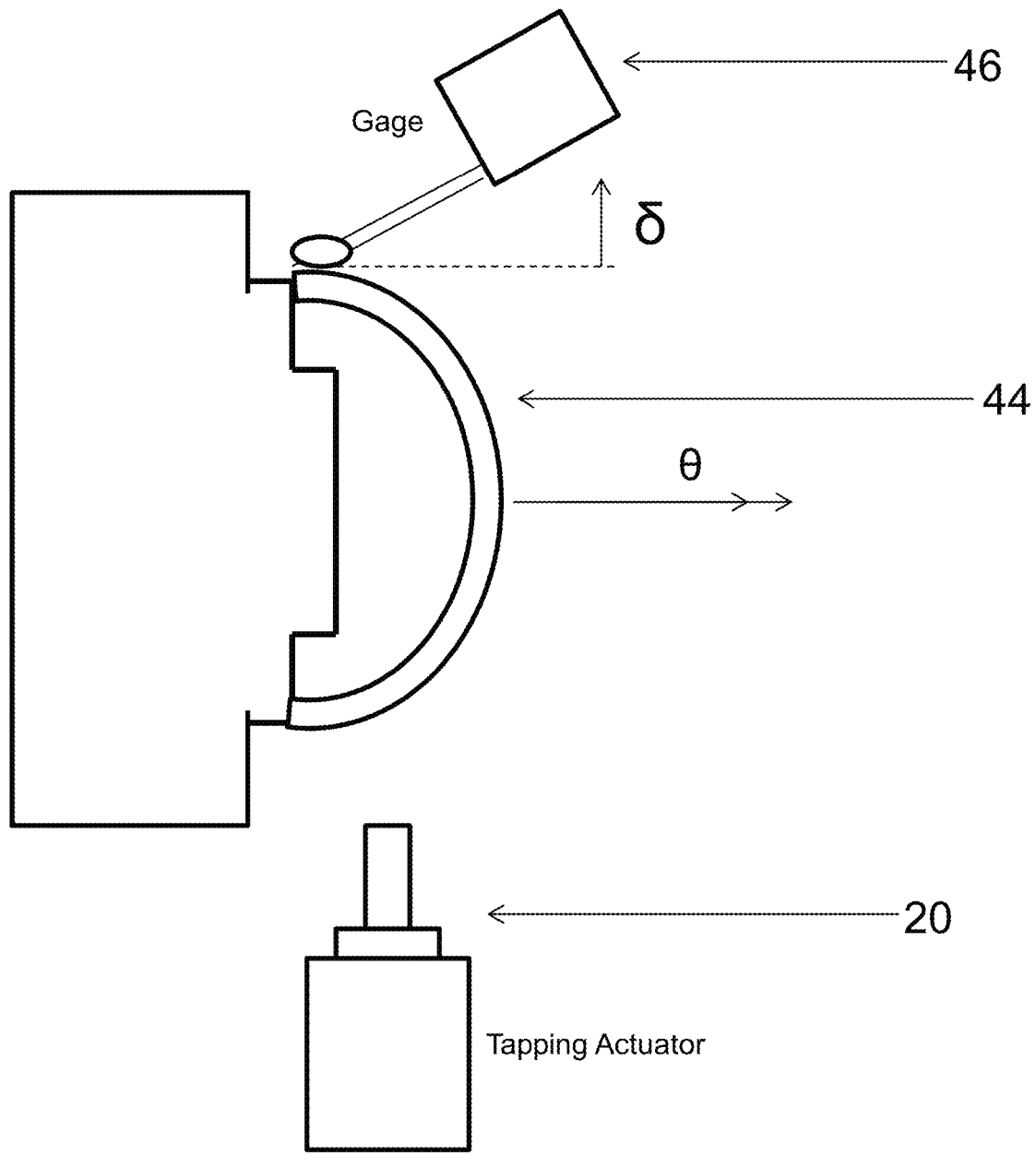
FIG. 20 is a schematic diagram illustrating a setup for a part actuation test in accordance with the systems and methods of the present disclosure.

With the performance of the tapping actuator 20 verified, tests were run to measure the displacement of a hemispherical part caused by an impulse. The part was held on the vacuum chuck by a 10 inHg vacuum, which generated a normal force of about 520 N (117 lbs). The test setup illustrated in FIG. 20 was used to determine the translational motion of the hemispherical part 44 after an applied impulse. A Federal gauge 46 is used to measure displacement, and the tapping actuator 20 is supplied with a controlled voltage input as illustrated in FIG. 16 multiplied by various gains.

Figure 21:
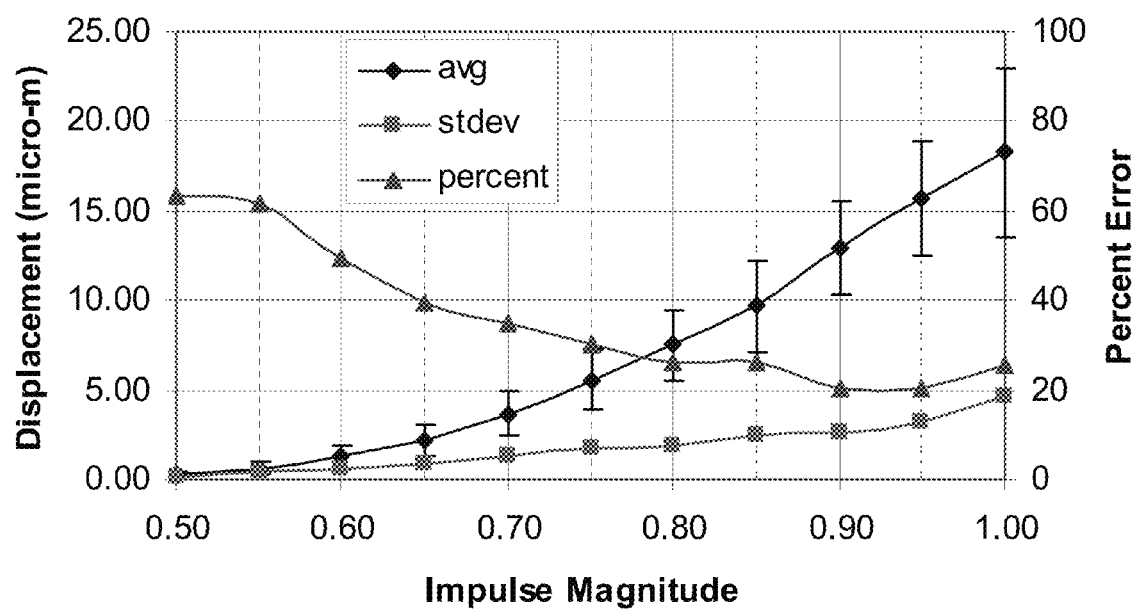
FIG. 21 is a plot illustrating the displacement of a hemishell part due to taps at random applied angles in accordance with the systems and methods of the present disclosure.

On each impulse magnitude setting, the part is tapped 10 times from 10 different randomly chosen directions, θ. The average and standard deviation of the part displacement caused by each of the 10 taps at the different angles are plotted as illustrated in FIG. 21. The average translational displacement of the part increases as the magnitude of the applied impulse increases, as expected.

The "percent" field shows repeatability as a percentage of the total displacement caused by a given tap, as calculated in Equation (7). Note that the lighter taps have a larger relative repeatability error than harder taps, where the standard deviation is only 20% of the average. For lighter taps, the standard deviation of the displacement is as large as 60% of the average. This suggests that either the input taps are not repeatable, or that the friction force varies with the part's orientation, θ, and that the variability is dependent on the magnitude of the displacement.

$$\text{percent} = \frac{stdev}{avg} * 100 \quad (7)$$

Figure 22:
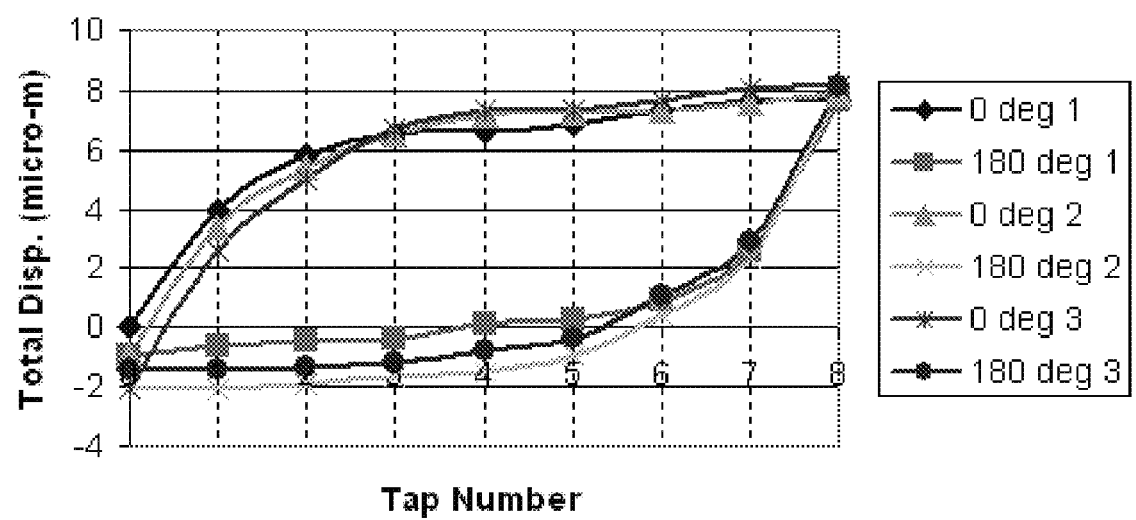
FIG. 22 is a plot illustrating the displacement of a part due to successive taps at a given impulse magnitude in accordance with the systems and methods of the present disclosure.

It was also observed that when the direction of a tap was reversed by 180 degrees, the first few taps following the reversal produced large displacements. FIG. 22 illustrates that the first tap applied immediately after the tap direction was reversed produced a larger displacement than the second, third, and so forth. When the direction was reversed 5 more times, the part traced the 3 loops in FIG. 22.

Figure 23:
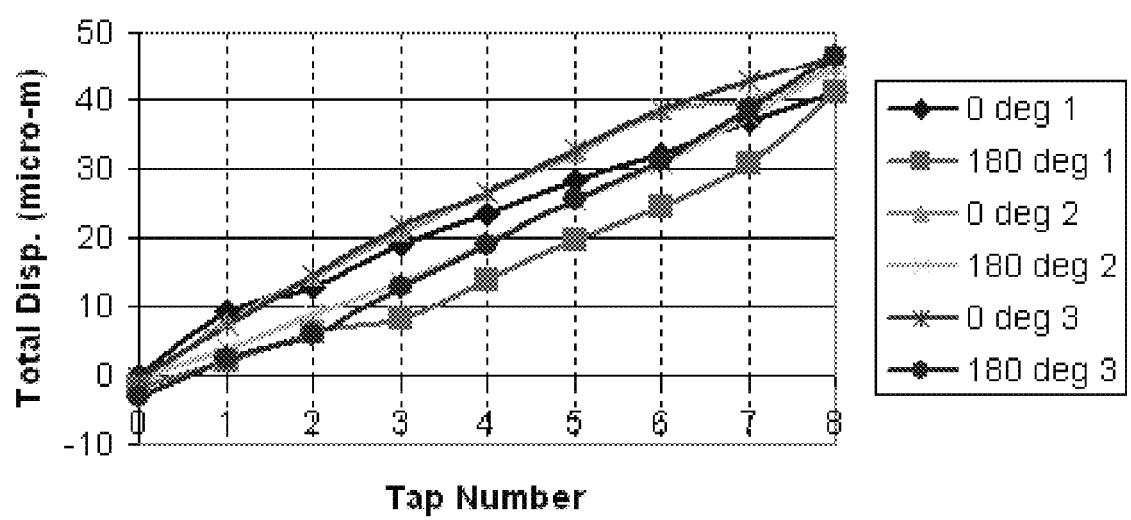
FIG. 23 is a plot illustrating the displacement of a part due to successive taps at another given impulse magnitude in accordance with the systems and methods of the present disclosure.

The reversal in actuation direction demonstrates that there is hysteresis in the friction force. This hysteresis is obvious when the impulse magnitude is 0.6, and to a lesser extent 0.7, as illustrated in FIG. 23.

Figure 24:
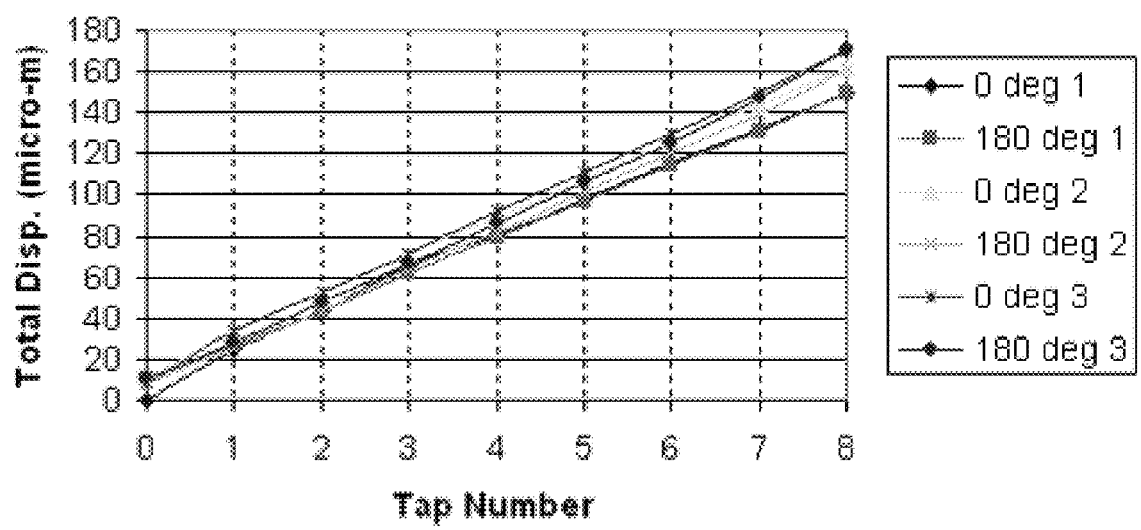
FIG. 24 is a plot illustrating the displacement of a part due to successive taps at a further given impulse magnitude in accordance with the systems and methods of the present disclosure.

FIG. 24 illustrates that the hysteresis loop is hardly noticeable when the impulse magnitude is 1.0. The shrinkage of the hysteresis loop as the displacement of each tap increases suggests that the effect is displacement dependent. When the taps are light, as in impulse magnitude of 0.6, the large displacements persist for the first several taps after reversal. When harder taps of 0.7 and 1.0 are used, the hysteretic effect is only noticeable for the very first tap, at most.

The friction interface is described as having elastic bristles that deform when the contacting surfaces translate with respect to one another, as illustrated in FIG. 7. This effectively allows some strain to build up in the interface. However, it is apparent that for two contacting aluminum surfaces, this strain does not relax quickly when the applied load is removed, and is thus maintained between taps. The retarding force appears to be smaller before some strain limit is reached. However, once this strain limit is met, the retarding force becomes equal to the static friction force. The tests above suggest that the strain limit is met between 4 and 6 µm (80-240 µin) of displacement, for example.

The actuator was implemented in an automatic part centering process. The process involved first measuring the run-out of the part, then turning the high side of the part towards the tapping actuator and moving the part by applying a number of taps at a given impulse. The number and impulse magnitude of the taps was calculated based on a calibration process. The part run-out was measured by measuring a number of points on the radius of the hemispherical part, then calculating a best fit sine wave. The amplitude of the sine wave represents the magnitude of the run-out, and the phase represents the run-out direction. This measurement method was repeated on a diamond turned sphere which is known to have a form error of ±5 µm. The measurement was repeated 8 times using 3 and 9 measurement points. A measurement was also repeated using 6000 points taken with an analog gauge.

Results show that using three measurement points on a part produces a measurement uncertainty of 6.62 µm, for example. If 9 measurement points are used, that uncertainty is reduced to 1.34 µm. Using an analog gauge set to collect 6000 data points over the course of one revolution of the part has a measurement uncertainty of only 40 nm. These uncertainties may vary depending on the wavelength and amplitude on the form error of the part being measured.

The procedure above is used to center a part that has either been manually placed on the OC chuck or automatically transferred from the IC chuck to the OC chuck. The first set of trials showed that a poor initial calibration could prevent the part from converging to within 5 µm of the spindle centerline. For example, assume that the initial calibration predicted that the part would move 20 µm under a given tap. If the run-out was measured to be 500 µm at 0 deg., the algorithm would tell the operator to apply 25 taps at 0 degrees. However, if the calibration value was bad and the part actually moved 40 µm with each tap, the part would overshoot the spindle center and end up at 500 µm at 180 deg. The algorithm would then determine that the user should apply the same tap in the opposite direction, once again resulting in overshoot. In this case, where the calibration factor underestimates the part's displacement by a factor of 2, the part will not converge to the spindle centerline.

Multiple tests showed that a larger error in the initial calibration would cause the realignment to take more steps to converge. Although friction force does not change greatly while a part is on the chuck, the interface can change while one part is replaced with another, thus causing calibration factors to become inaccurate.

Figure 25:
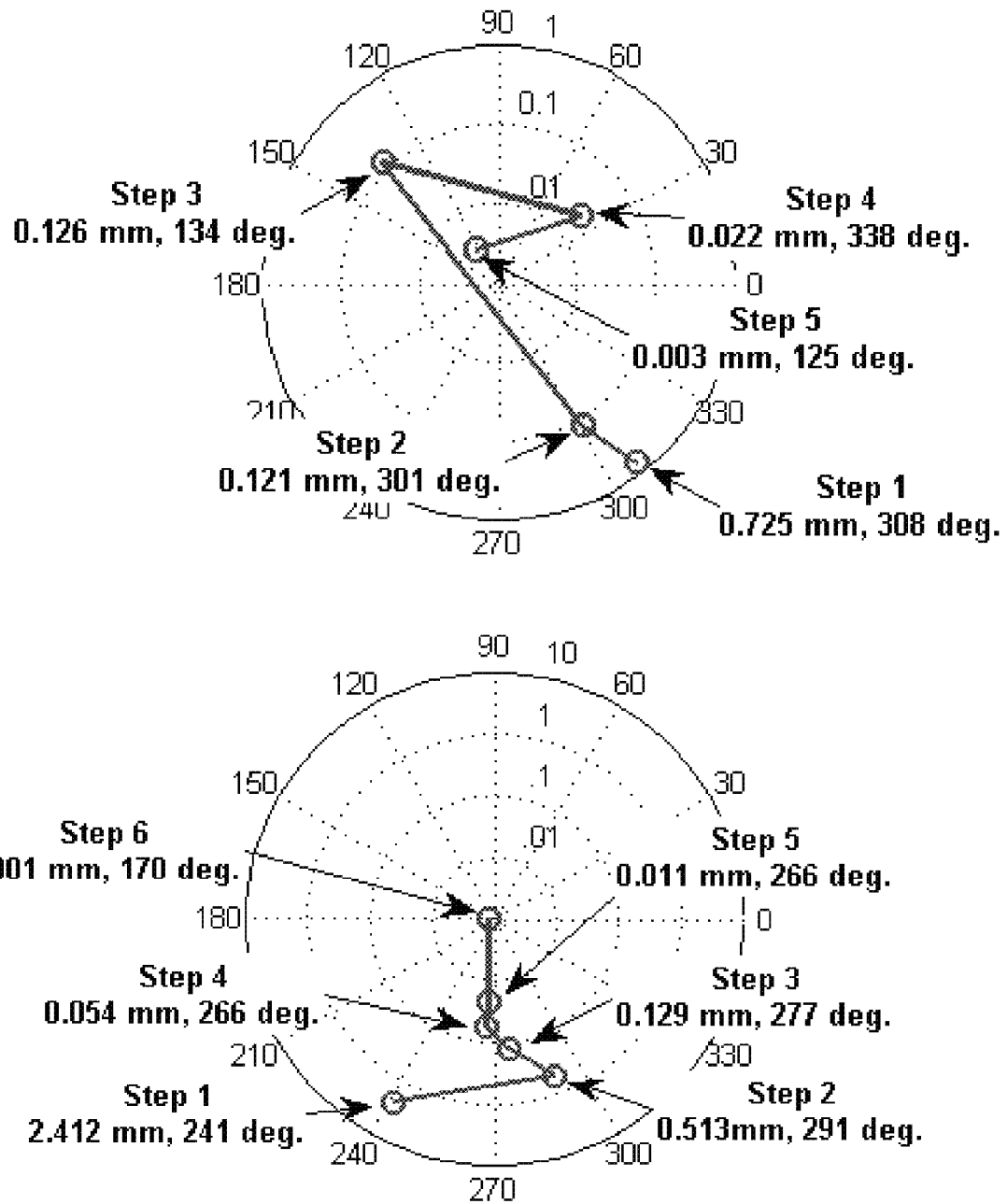
FIG. 25 is a series of plots illustrating the path of a part during various centering operations in accordance with the systems and methods of the present disclosure.

To overcome this impediment to convergence, an adaptive calibration scheme is used to update the calibration values after each move. In the example above, the computer would recognize that 25 taps produced a 1000 µm total displacement and would then update the calibration value to 40 µm/tap. Then on the second step, the part would converge to the spindle centerline. Once this adaptive calibration scheme is applied, a part can be manually placed on the OC chuck with run-out ~1 mm and realigned; in all of the tests done with the adaptive calibration scheme, the part never failed to converge. Since the adaptive calibration scheme needs to see the result of a tap at a given impulse magnitude to update the calibration value for that impulse, a poor set of initial calibration data can still result in realignment taking as many as 10 iterations. Plots of two of these tests are illustrated in FIG. 25. Both of the cases illustrated employ adaptive calibration and converge in 5 and 6 steps; all cases tested with adaptive calibration converged in less than 7 steps. It may be beneficial to reduce the number of available tap impulse magnitudes so that there is only a "coarse tap" and a "fine tap." Then the adaptive calibration scheme would only have to update calibration values for 2 impulse magnitudes, thus reducing the number of iteration steps required. Note that the radial scale in FIG. 25 is logarithmic.

Thus, an automated part centering system has been designed and implemented on a turning machine. The run-out is measured by locating multiple points on the hemispherical part's surface, either with a probe or analog gauge, and calculating a best fit sine wave. The amplitude of this sine wave represents the magnitude of the run-out, and the phase defines the direction. An algorithm was developed to calculate the number of taps required at a given impulse magnitude to center the part. Initially, previously recorded calibration values were used in this algorithm. However, since poor initial calibration values can result in non-convergence, it became necessary to update the calibration values based on the previous actuation steps. This adaptive calibration scheme succeeded in aligning a part to within 5 µm of the spindle centerline in less than 7 steps every time tested. In each of these tests, the part was manually placed on the OC Chuck and an initial run-out of 1-2 mm was corrected.

This method offers significant advantages over existing centering techniques. First, the run-out measurement gives only one nominal value—previous methods could indicate multiple high spots on a part with long wavelength form errors. Also, the VCM actuator can generate actuation forces that can move a large part (50 lbs) that is held in place by a friction force greater than 250 N. Analysis of the collision between the tapping actuator head and a spherical part ensures that neither body is plastically deformed during repeated taps. Other methods are designed to actuate parts that are sitting on a surface. In these methods, the normal force required to overcome friction is relatively small, and determined primarily by the weight of the part.

Also, the use of a VCM instead of a spring or solenoid gives superior control of the velocity of the impacting element as it translates. The ability to produce a repeatable tap through 3 mm of stroke eliminates the need for precision alignment of the actuator and enables the correction of run-out as large as 2.5 mm. This gives an operator an option to use open loop control to position the part if the part position cannot be measured in real-time and used as feedback.

Additional tests could be done to make sure the realignment procedure is robust to changes in the friction interface, vacuum pressure, part size, shape, and material, as well as potential operator error. These improvements will likely make this automated centering system fast and robust enough to be viable in any industrial setting.

Again, one of the first steps in most machining processes involves aligning the workpiece with axes of the machine. For a lathe, this involves aligning the workpiece with the center of rotation of the spindle. If done manually, this centering procedure can be laborious, time-intensive, and error-prone.

The present disclosure provides a faster, more precise, automated solution to part centering. This solution operates while the machine spindle continuously rotates at a known constant speed less than 20 rpm, for example. The solution operates without connection to the machine tool axes and uses the constant spindle speed to estimate angular position of the runout signal.

Figure 26:
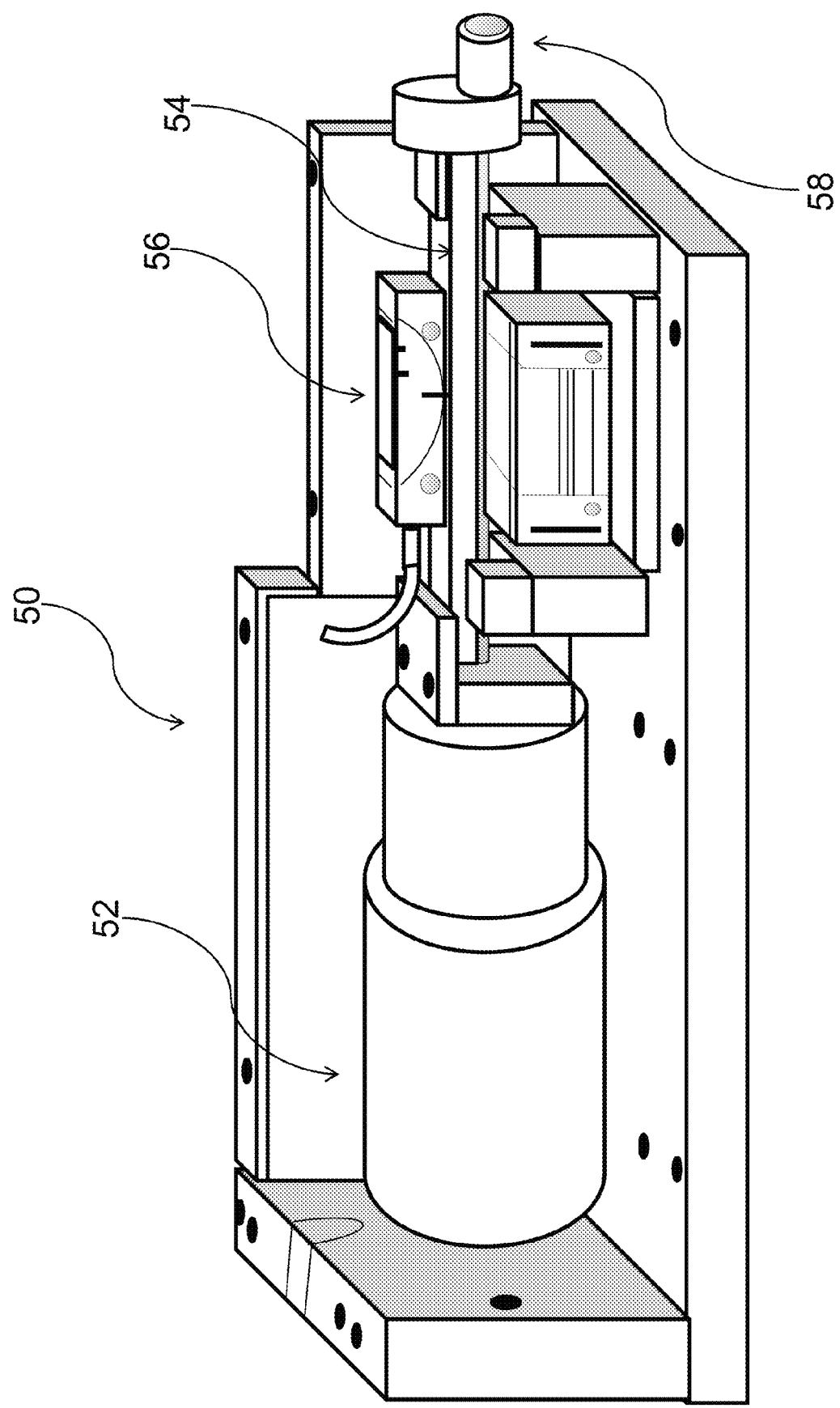
FIG. 26 is a perspective view of another exemplary embodiment of the tapping actuator of the present disclosure.

The system of the present disclosure is able to measure part runout, as well as precisely tap the part to move it towards the center of rotation. The device works in two modes: measurement and tap. The internal components of the system 50 are again illustrated in FIG. 26. In the measurement mode, the voice-coil actuator 52 supplies a light pre-load force such that the tip 58 contacts the part (not illustrated). As the part rotates, the encoder 56 reads the displacement of the tip 58, which is a measurement of part runout, as a function of time. Assuming the speed of the spindle remains constant, the time can be turned into spindle position. The resulting displacement vs. spindle position data can then be used in a least-squares circle fit to find the center of the part and thus the location of the high spot. In the tap mode, a variable voltage signal with a duration of 20 ms, for example, is applied to the voice-coil actuator 52. This signal accelerates the coil-rail-tip assembly to a desired impact velocity. The assembly will collide with the part at or near the high spot and move it towards the center of rotation. The system 50 may also include a protective bellows (not illustrated) and clear plastic shields (not illustrated). Exemplary dimensions of the aluminum structure are: 60×50×150 mm (2.3×2.0×6.1 in) and it weights 1.4 kg (3 lbs).

The control system includes a laptop or the like for the user interface, a microcontroller to calculate the amplitude and location of the tap, and an amplifier/power supply to drive the voice coil. The microcontroller includes on-board quad decoder chips to read the optical encoder. The analog output of the microcontroller sends precisely timed analog pulses to the amplifier. The microcontroller runs an algorithm that determines when and how hard to tap the part, as well as the circle fit algorithm that fits a least squares circle to the collected data. The center of this circle corresponds to the angular location of the high spot. A graphical user interface on a laptop or the like is able to display information, such as runout on the screen, as well as allow the operator to give the microcontroller information, such as part weight, which is used by the tap algorithm.

There are many challenges to automating the centering process as well as geometric constraints. The centering device is designed to replace a cutting tool on a machining center. As a result, it is oriented to tap the part horizontally, either in a radial or axial direction. Vertical or other orientations may also be utilized; however, this complicates the positioning brackets needed to address multiple part sizes on 2-axis lathes. The centering process should be accomplished without input from the machine tool controller. On a spindle with a horizontal axis, for example, the part moves horizontally due to the impact. However, it also falls vertically due to gravity. Understanding this two-dimensional motion is vital to successful alignment. Given parameters such as part weight, initial misalignment, and vacuum pressure, the alignment algorithm selects the initial tap magnitude and subsequent taps to quickly center the part. The device should be sensitive enough to ensure alignment of 2.2 kg (5 lb) parts, for example, but also powerful enough to rapidly align a 22 kg (50 lb) part, for example, with an initial misalignment of 1.25 mm, for example.

Figure 27:
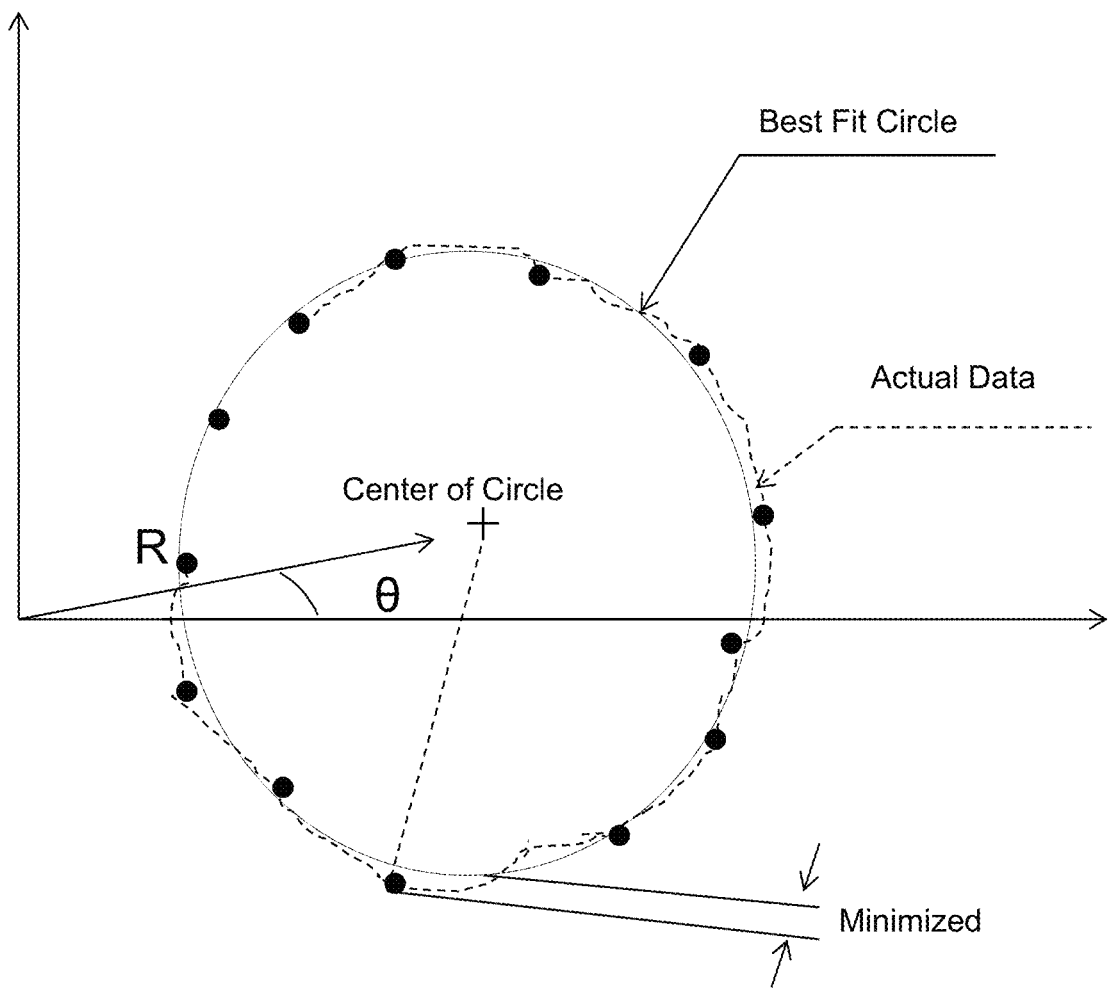
FIG. 27 is a plot illustrating a series of measurements of the location of surface points in terms of radius and angle in accordance with the systems and methods of the present disclosure.

The alignment process begins with a measurement of the location of the part center followed by an impact of standard magnitude at the high point. Based on the motion of the part center measured after this impact, a new impact force is calculated and implemented. The first step in the alignment error measurement process is to find the initial alignment of the part with respect to the spindle rotation axis. FIG. 27 illustrates a series of measurements of the location of surface points in terms of radius and angle. The radius is the encoder reading of the contact point between the plastic tip and the part plus some nominal radius. The load, and therefore wear, on the nylon tip is negligible. The angle is calculated from the spindle speed input by the operator and the system clock for each point. A least-squares algorithm is used to find the center of the circle, and thus the misalignment.

Figure 28:
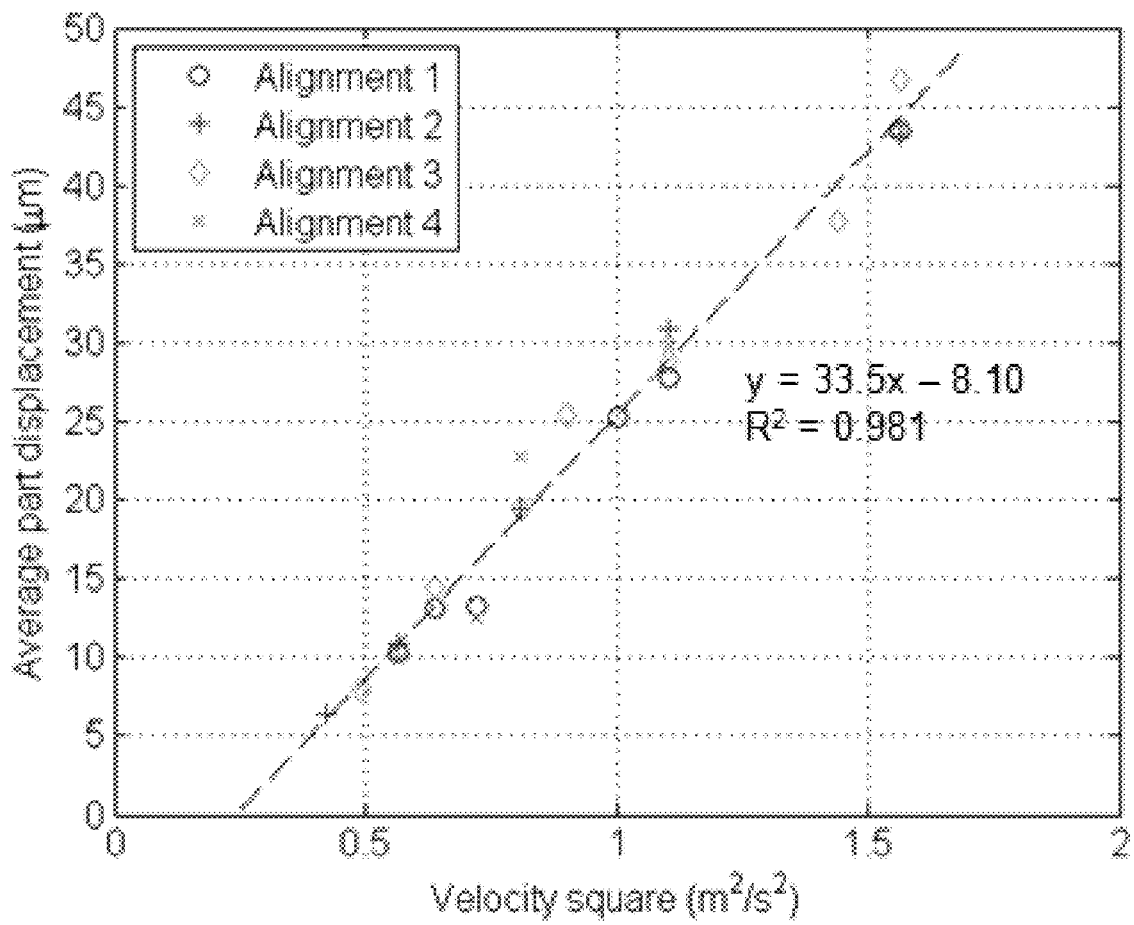
FIG. 28 is a plot illustrating that the displacement for a specific part is a function of the square of the impact speed, or the momentum, of the impacting mass in accordance with the systems and methods of the present disclosure.

Based on the magnitude of the misalignment, the velocity of the impacting mass can be determined. The motion of the part depends on the friction between the part and vacuum chuck, the vacuum pressure, and the mass of the part. The part displacement can be measured and related to the velocity of the mass at impact. FIG. 28 illustrates that displacement for a specific part is a function of the square of the impact speed or the momentum of the impacting mass.

Figure 29:
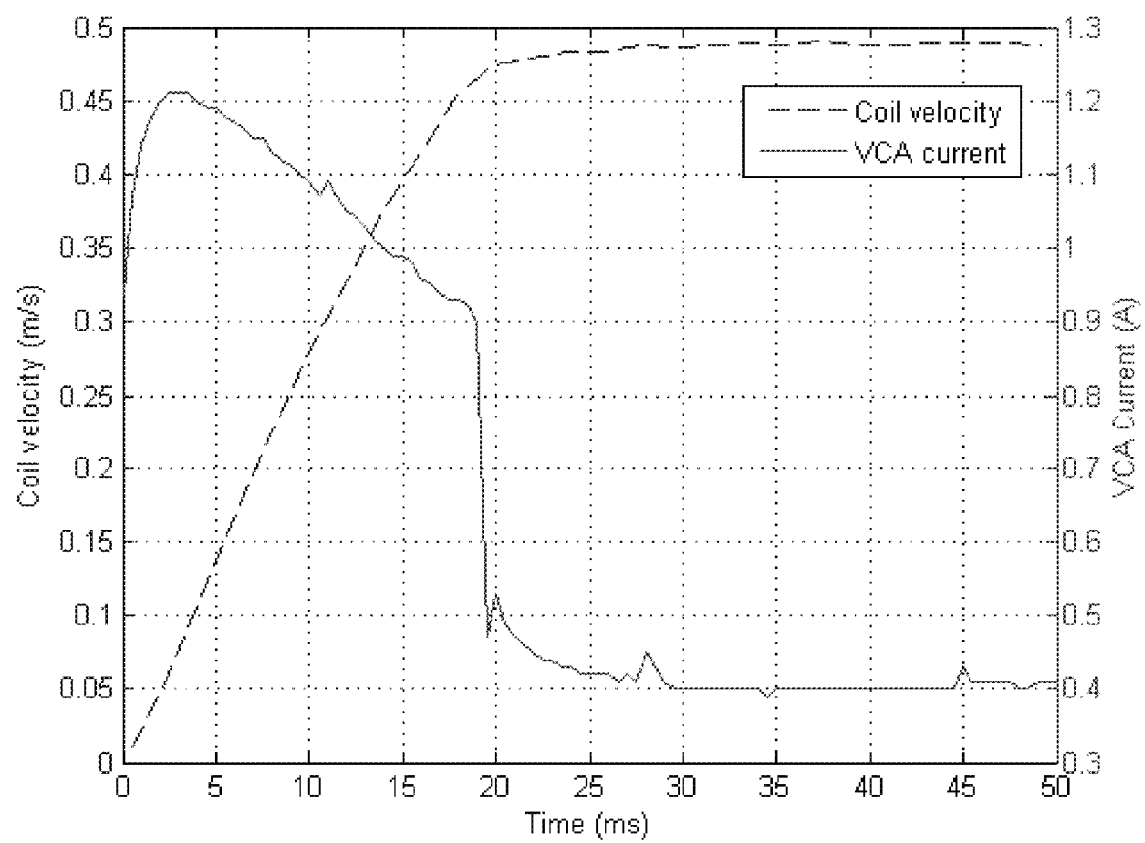
FIG. 29 is a plot illustrating the actuation of the voice coil motor to accelerate the mass in accordance with the systems and methods of the present disclosure.

Actuation is accomplished in two steps: the first step is to apply a high current to accelerate the mass to the desired speed, followed by a low current to overcome the drag in the ball bearing slide. This is illustrated in FIG. 29.

The device is able to tap the part near the high spot up to 3 times in one revolution, for example. Tapping multiple times per revolution allows the device to align parts more quickly. If it is observed that the maximum impact velocity yields a part displacement less than the new misalignment value, it may be useful to tap the part multiple times during one revolution.

Figure 30:
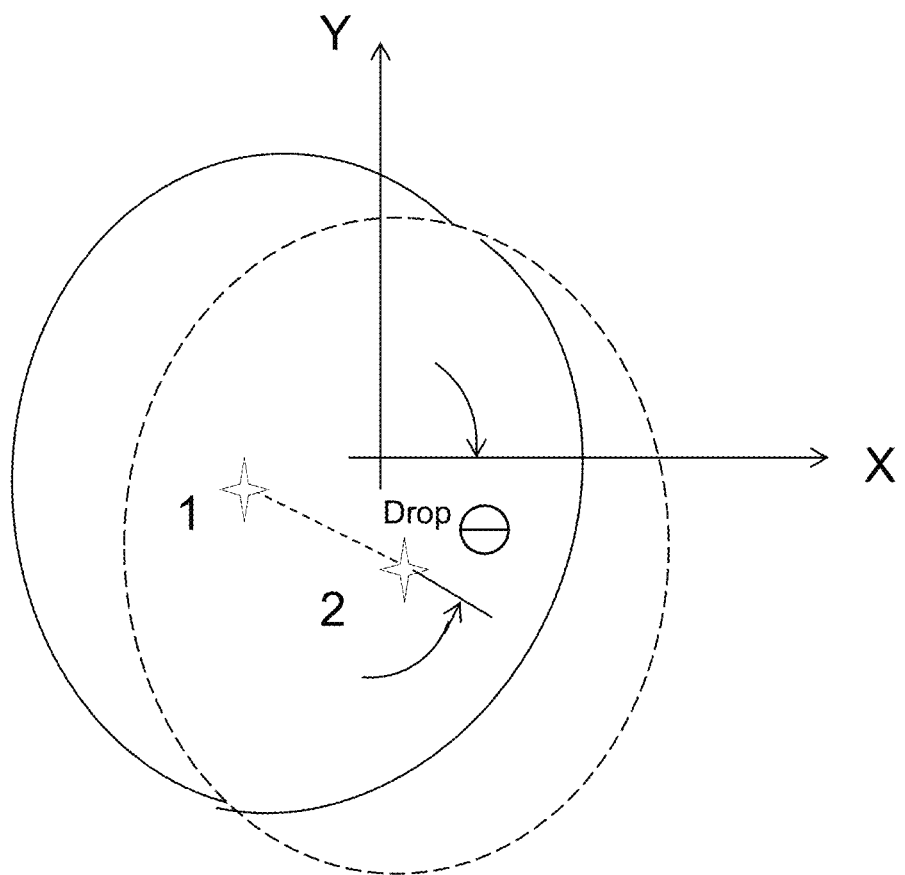
FIG. 30 is a plot illustrating the horizontal and vertical motion of a part when it is tapped from the side in accordance with the systems and methods of the present disclosure.

FIG. 30 illustrates the horizontal and vertical motion of a part, mounted on a horizontal spindle, when it is tapped from the side. If the part is tapped at the high point each time and the drop angle is on the order of 60°, the part will move over and down but stay at nearly the same misalignment. To overcome this problem, the part is hit after the high spot passes, which will drive it toward the spindle center. The motion of the part from the first impact is used to find the drop angle and apply this correction to center the part.

Figure 31:
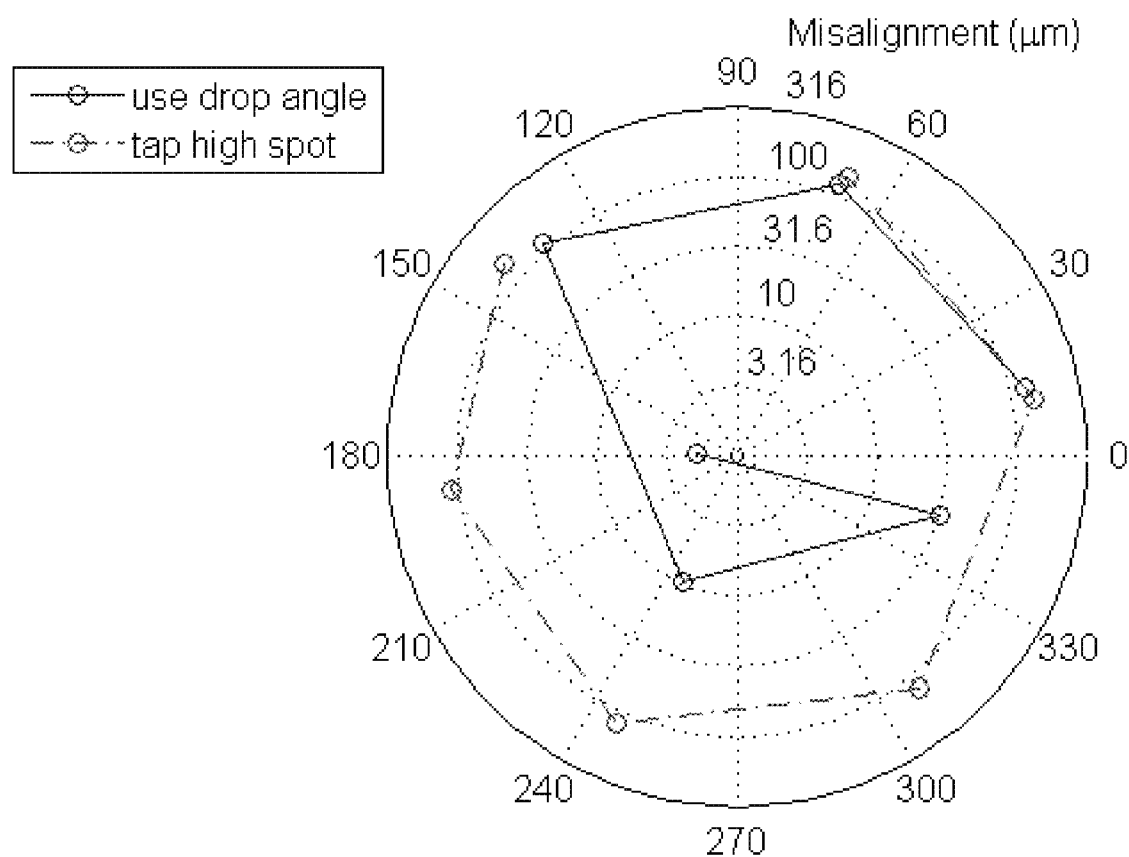
FIG. 31 is a plot illustrating test results in accordance with the systems and methods of the present disclosure.
Figure 32:
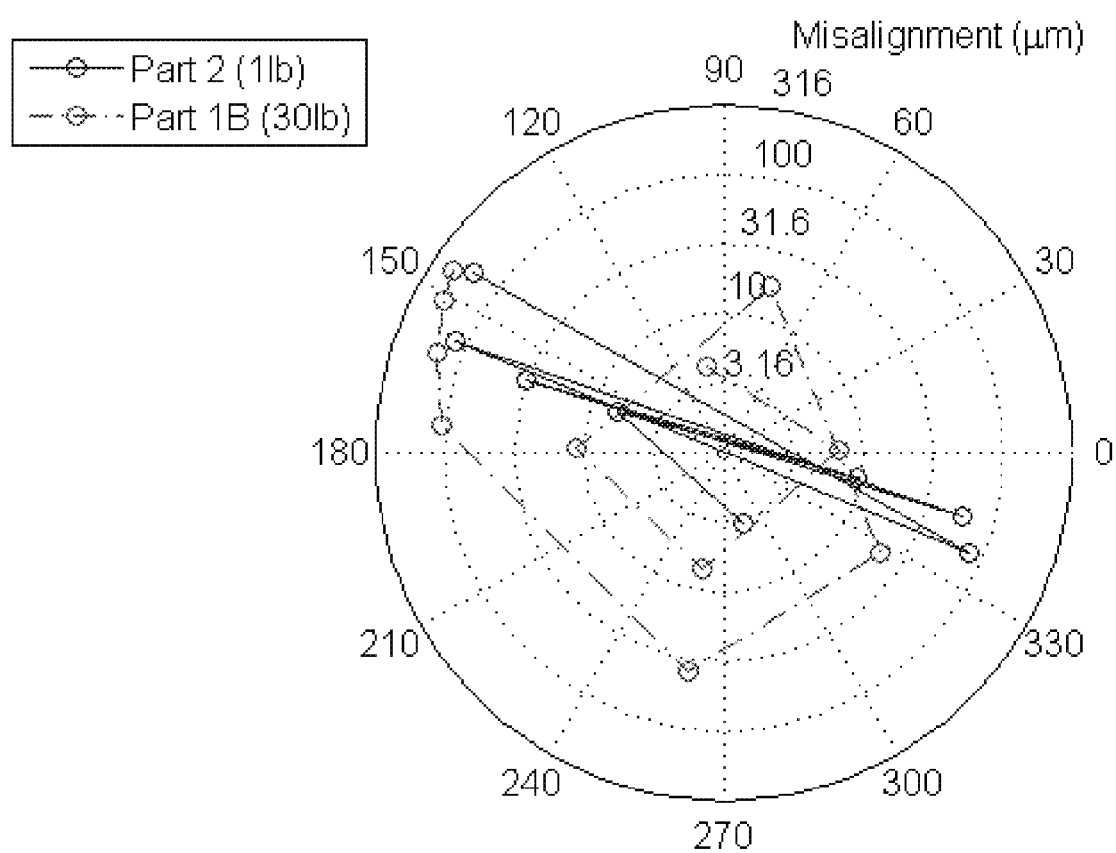
FIG. 32 is a plot illustrating additional test results in accordance with the systems and methods of the present disclosure.

The fully-automated program has been tested for a variety of part weights, vacuum pressures, OC and IC chuck configurations, and materials. The results of several tests are illustrated in FIGS. 31 and 32. These figures show the locus of the part centers as the alignment proceeds. The location of the center is shown on a polar plot as an angular location and a radius. The radius is a log scale.

For heavy parts with low vacuum pressure, it is not possible to align a part to 2.5 µm by simply tapping the high spot. In this case, it is necessary to tap the workpiece when the high spot is above the tip, such that the part will fall towards the rotational center as well as displace horizontally. As illustrated in FIG. 31, the workpiece could not be aligned by simply tapping the high spot. In five cycles of tapping only at the high spot, the workpiece misalignment remained around 100 μm. However, with five taps using drop angle compensation, the workpiece was aligned to 1.97 μm. It is important to note that the first three measurements are about the same (~100 μm) using compensation because for the first and second tap, drop angle values were calculated and used in the following taps. FIG. 32 illustrates a plot of the alignment process at a vacuum of 11.1 psi on the OC chuck for two parts of different weight. In both cases, the workpiece begins at a misalignment of 150 μm and ends with a final misalignment of 3 μm. The 1 lb part displaces back and forth until the appropriate tap velocity is determined. The 30 lb part, however, follows a less direct path towards the center of rotation due to a larger drop angle. Thus, FIG. 32 illustrates the additional challenge of centering a heavy part on a vertical chuck face. One interesting observation is that the alignment process generally spends a significant number of iterations around the target goal. This is to be expected as variations in friction and displacement direction make it challenging to precisely position a workpiece. The angle drop capability was turned off in FIG. 32, so the effect of part weight on the alignment process could be better observed.

Figure 33:
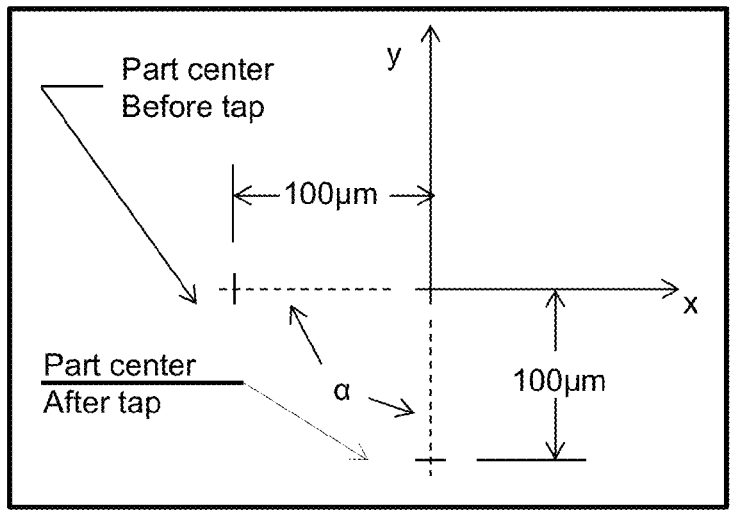
FIG. 33 is a series of plots illustrating a gravitational embodiment in accordance with the systems and methods of the present disclosure.
Figure 33:
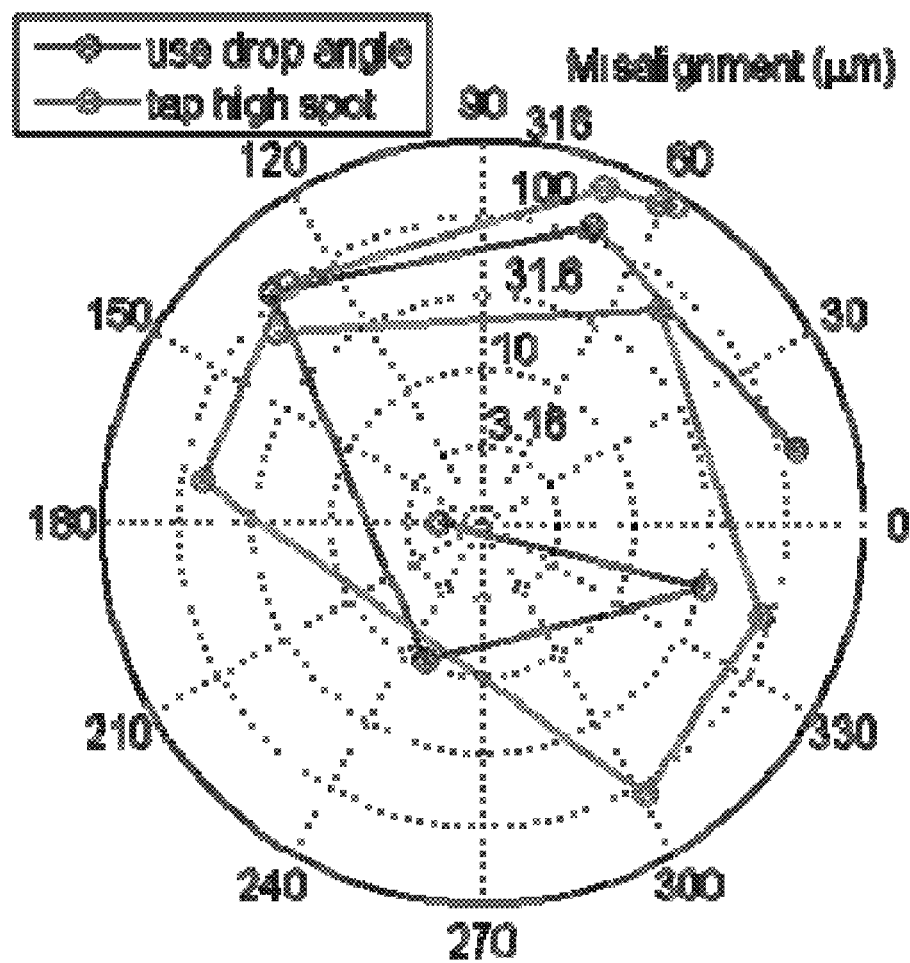

The horizontal implementation of the present disclosure is much more versatile than conventional implementations because the actuator can be mounted in a machine's tool holder and used to align a part in both the radial and axial directions (for inner and outer contour machining operations). However, as the part weight is increased and/or the vacuum pressure is reduced, the gravitational influence on the sliding part is magnified. (The vacuum level has to be low enough to allow the part to move when it is tapped but as soon as the tap causes motion between the part and the fixture gravity pulls the part in the vertical direction.) Referring to FIG. 33, one may be tapping the part hard enough to try to move it 100 microns in the horizontal direction, but the gravitational force instead pulls it so far down that the alignment has not been improved. This problem is avoided by tapping the part once (at the apparent "high spot") to determine the effect of gravity, friction, and the part weight. Then subsequent taps are performed at an adjusted angle (by rotating past the high spot) so that when the part "drops", it goes to the desired location in relation to the spindle centerline. In the example of FIG. 33, instead of tapping the part at the "high spot" the part is rotated until the "high spot" is 45 degrees above the horizontal plane before tapping it. The lower figure illustrates an example of the performance difference using the "drop angle compensation" and just tapping on the "high spot" as indicated by the runout measurement. As is apparent, with no compensation, the location of the high spot "moves around the spindle fixture," but the amount of misalignment between the part and the fixture is not reduced very quickly. In contrast, the use of the "drop angle compensation" allows the process to quickly converge to the desired level of alignment. (Multiple taps are also used, within about 1 second and strategically positioned around the target point, to accelerate the alignment process.)

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A system for performing on-machine measurements and automatic part alignment, comprising:
a measurement component operable for determining the position of a part on a machine; and
an actuation component operable for adjusting the position of the part on the machine by contacting the part with a predetermined force responsive to the determined position of the part;
wherein the measurement component and the actuation component comprise a single linear actuator operable for contacting the part with a first lighter force for determining the position of the part and with a second harder force for adjusting the position of the part.

2. The system of claim 1, wherein the measurement component comprises a transducer.

3. The system of claim 1, wherein the actuation component comprises a linear actuator.

4. The system of claim 1, wherein the part is coupled to the machine on a spindle via one of vacuum force and movable mechanical means.

5. The system of claim 1, further comprising an angular measurement component operable for measuring the angular position of the part.

6. The system of claim 1, wherein the actuation component is utilized in a substantially horizontal configuration and the effects of substantially vertical gravitational drop of the part when the part is contacted are accounted for in the force applied to the part by the actuation component and the timing of the contact using a processor.

7. A method for performing on-machine measurements and automatic part alignment, comprising:
providing a measurement component operable for determining the position of a part on a machine; and providing an actuation component operable for adjusting the position of the part on the machine by contacting the part with a predetermined force responsive to the determined position of the part;

wherein the measurement component and the actuation component comprise a single linear actuator operable for contacting the part with a first lighter force for determining the position of the part and with a second harder force for adjusting the position of the part.

8. The method of claim 7, wherein the measurement component comprises a transducer.

9. The method of claim 7, wherein the actuation component comprises a linear actuator.

10. The method of claim 7, wherein the part is coupled to the machine on a spindle via one of vacuum force and movable mechanical means.

11. The method of claim 7, further comprising providing an angular measurement component operable for measuring the angular position of the part.

12. The method of claim 7, wherein the actuation component is utilized in a substantially horizontal configuration and the effects of substantially vertical gravitational drop of the part when the part is contacted are accounted for in the force applied to the part by the actuation component and the timing of the contact using a processor.

13. A method for performing on-machine measurements and automatic part alignment, comprising:

providing a measurement component operable for determining the position of a part on a machine; and providing an actuation component operable for adjusting the position of the part on the machine by contacting the part with a predetermined force responsive to the determined position of the part;

wherein the actuation component is utilized in a substantially horizontal configuration and the effects of substantially vertical gravitational drop of the part when the part is contacted are accounted for in the force applied to the part by the actuation component and the timing of the contact using a processor; and wherein the measurement component and the actuation component comprise a single linear actuator operable for contacting the part with a first lighter force for determining the position of the part and with a second harder force for adjusting the position of the part.

14. The method of claim 13, wherein the measurement component comprises a transducer.

15. The method of claim 13, wherein the actuation component comprises a linear actuator.

16. The method of claim 13, further comprising providing an angular measurement component operable for measuring the angular position of the part.

17. The method of claim 13, further comprising identifying a high spot associated with a rotating part and contacting the part at other than the high spot such that a combination of the contact force and gravitational force move the part to a desired alignment.

* * * * *